United States Patent
Yue et al.

(10) Patent No.: US 12,466,887 B2
(45) Date of Patent: Nov. 11, 2025

(54) ANTIBODY BINDING TO PD-1

(71) Applicant: Bio-Thera Solutions, Ltd., Guangzhou (CN)

(72) Inventors: Haitao Yue, Guangzhou (CN); Jian Lin, Guangzhou (CN); Shujun Pei, Guangzhou (CN); Shizhong Liang, Guangzhou (CN); Shengfeng Li, Guangzhou (CN)

(73) Assignee: Bio-Thera Solutions, Ltd., Guangzhou (CN)

( * ) Notice: Subject to any disclaimer, the term of this patent is extended or adjusted under 35 U.S.C. 154(b) by 953 days.

(21) Appl. No.: 17/602,715

(22) PCT Filed: Apr. 9, 2020

(86) PCT No.: PCT/CN2020/083954
§ 371 (c)(1),
(2) Date: Oct. 8, 2021

(87) PCT Pub. No.: WO2020/207432
PCT Pub. Date: Oct. 15, 2020

(65) Prior Publication Data
US 2022/0204623 A1    Jun. 30, 2022

(30) Foreign Application Priority Data
Apr. 10, 2019    (CN) .......................... 201910286677.9

(51) Int. Cl.
*C07K 16/28*    (2006.01)
*G01N 33/574*    (2006.01)
*G01N 33/68*    (2006.01)

(52) U.S. Cl.
CPC ....... *C07K 16/2818* (2013.01); *G01N 33/574* (2013.01); *G01N 33/68* (2013.01); *C07K 2317/21* (2013.01); *C07K 2317/52* (2013.01); *C07K 2317/565* (2013.01); *C07K 2317/622* (2013.01); *C07K 2317/76* (2013.01); *C07K 2317/92* (2013.01)

(58) Field of Classification Search
CPC ............ C07K 16/2818; C07K 2317/21; C07K 2317/52; C07K 2317/565; C07K 2317/622; C07K 2317/76; C07K 2317/92; C07K 2317/56; G01N 33/574; G01N 33/68; G01N 2333/70532; G01N 2333/70521; A61P 35/00; A61P 35/02; A61P 37/04
See application file for complete search history.

(56) References Cited

U.S. PATENT DOCUMENTS 6,423,538 B1 *   7/2002   Wittrup .............. G01N 33/6854
                                                       435/254.2

FOREIGN PATENT DOCUMENTS

| CN | 108997499 A | 12/2018 |
| WO | WO 2008156712 A1 | 12/2008 |
| WO | WO 2017055547 A1 | 4/2017 |
| WO | WO 2018181064 A1 | 10/2018 |
| WO | WO 2018217227 A1 | 11/2018 |

OTHER PUBLICATIONS

Rudikoff et al Proc Natl Acad Sci USA 1982 vol. 79 p. 1979 (Year: 1982).*
Mills, B.J.,et. al. (2020). Chapter 1: Monoclonal Antibodies: Structure, Physicochemical Stability, and Protein Engineering. In: Jameel, F., Skoug, J., Nesbitt, R. (eds) Development of Biopharmaceutical Drug-Device Products. AAPS Advances in the Pharmaceutical Sciences Series, vol. 35. Springer, (Year: 2020).*
Almagro et. al., Front. Immunol. 2018; 8:1751 (Year: 2018).*
Chiu ML et al. Antibodies 2019 8, 55, 1-80 (Year: 2019).*
Zak et al. Structural Biology of the Immune Checkpoint Receptor PD-1 and Its Ligands PD-L1/PD-L2, Structure, 25 pp. 1163-1174 (Year: 2017).*
Horita S, Nomura Y, Sato Y, Shimamura T, Iwata S, Nomura N. High-resolution crystal structure of the therapeutic antibody pembrolizumab bound to the human PD-1. Sci Rep. Oct. 13, 2016;6:35297. doi: 10.1038/srep35297. PMID: 27734966; PMCID: PMC5062252 (Year: 2016).*
Truck J, Ramasamy MN, Galson JD, Rance R, Parkhill J, Lunter G, Pollard AJ, Kelly DF. Identification of antigen-specific B cell receptor sequences using public repertoire analysis. J Immunol. Jan. 1, 2015;194(1):252-261. doi: 10.4049/jimmunol. 1401405. Epub Nov. 12, 2014. PMID: 25392534; PMCID: PMC4272858 (Year: 2014).*
Jespersen MC, Mahajan S, Peters B, Nielsen M, Marcatili P. Antibody Specific B-Cell Epitope Predictions: Leveraging Information From Antibody-Antigen Protein Complexes. Front Immunol. Feb. 26, 2019;10:298. doi: 10.3389/fimmu.2019.00298. PMID: 30863406; PMCID: PMC6399414 (Year: 2019).*
"DNA Hybridizaiton" Cliffs Notes Study Guide. Captured online via web.archive.org Feb. 17, 2016 (Year: 2016).*

(Continued)

*Primary Examiner* — Janet L Epps-Smith
*Assistant Examiner* — Kathleen Cunningchen
(74) *Attorney, Agent, or Firm* — Sheppard Mullin Richter & Hampton LLP

(57) ABSTRACT

Disclosed herein are antibodies that bind to PD-1, comprising one or more CDRs selected from the amino acid sequences of SEQ ID NOs: 13, 14, 15, 16, 17, and 18. The antibodies have high affinity and low dissociation rate for PD-1, as well as the activity for neutralizing PD-1 in vitro. The antibodies disclosed herein can be full-length antibodies or antigen-binding fragments thereof. The antibodies can be used for detecting PD-1 and the like.

12 Claims, 2 Drawing Sheets
Specification includes a Sequence Listing.

(56) References Cited

OTHER PUBLICATIONS

Bowers, P.M., et al., 2018. The use of somatic hypermutation for the affinity maturation of therapeutic antibodies (pp. 479-489). Springer New York. (Year: 2018).*

Kuroda, D. and Tsumoto, K., 2018. Antibody affinity maturation by computational design. Antibody Engineering: Methods and Protocols, pp. 15-34 (Year: 2018).*

Rudikoff, Stuart et al., "Single amino acid substitution altering antigen-binding specificity" Laboratory of Cell Biology, National Institutes of Health, 1982, vol. 79, pp. 1979-1983.

Luo, Longlong et al., "Selection and characterization of the novel anti-human PD-1 FV78 antibody from a targeted epitome mammalian cell-displayed antibody library" Cellular & Molecular Immunology, 2018, vol. 15, pp. 146-157.

Maute, Roy L. et al., "Engineering high-affinity PD-1 variants for optimized immunotherapy and immuno-PET imaging", PNAS, 2015, E6506-E6514.

Supplementary European Search Report Dated Jun. 14, 2023 for European Patent Application No. 20788554.2, 17 pages.

International Search Report and Written Opinion for PCT/CN2020/083954 dated Jun. 24, 2020, 7 pages.

Office Action for China Application No. 202010275368.4, Feb. 10, 2023, 10 pages with English translation.

\* cited by examiner

ANTIBODY BINDING TO PD-1

CROSS REFERENCE TO RELATED APPLICATIONS

This application is a U.S. National Stage Application under 35 U.S.C. 371 of International Application No. PCT/EP2020/083954, filed Apr. 9, 2020, which claims priority to CN 201910286677.9, filed Apr. 10, 2019, the contents of each of which is hereby incorporated in its entirety by reference herein.

SEQUENCE LISTING

The Sequence Listing is submitted concurrently with the specification as an ASCII formatted text file via EFS-Web, with a file name of "63CP_341824_US_Sequence_Listing.txt", a creation date of Oct. 8, 2021, and a size of 40 kilobytes. The Sequence Listing filed via EFS-Web is part of the specification and is incorporated in its entirety by reference herein.

TECHNICAL FIELD

The invention relates to the field of biotechnology, and more specifically to antibodies binding to PD-1.

BACKGROUND

Programmed cell death 1 (PD-1) is an immunoinhibitory receptor expressed on activated T cells, B cells, and myeloid cells, and is a member of the CD28 immunoglobulin superfamily. PD-1 is a 55 kDa type I transmembrane glycoprotein comprising an Ig variable domain for binding to a ligand, and a cytoplasmic tail region for binding to a signaling molecule. The PD-1 cytoplasmic tail region contains two tyrosine-based signaling motifs, immunoreceptor tyrosine-based inhibitory motif (ITIM) and immunoreceptor tyrosine-based switch motif (ITSM).

Two ligands for PD-1, PD-L1 and PD-L2, have been identified as constitutively expressed or inducible on a variety of cells including non-hematopoietic tissues as well as various tumors. PD-L1 is expressed on B cells, T cells, myeloid cells, and dendritic cells as well as peripheral cells (such as microvascular endothelial cells) and non-lymphoid organs (such as heart, lung). In contrast, PD-L2 is present only in macrophages and dendritic cells.

The role of PD-1 in cancer has been reported in the literature. It was demonstrated that the interaction between PD-1 and its ligands down-regulates antigen receptor signaling, suppressing T cell response. The mechanism by which PD-1 attenuates T cell responses is similar to that of CTLA-4 in a manner that both molecules regulate an overlapping series of signal transduction proteins, but differs. PD-L1 is abundant in a variety of human tumors (and can be induced by IFNγ in most PD-L1 negative tumor cells). There are numerous studies to date showing that the interaction between PD-1 and PD-L1 results in a decrease in tumor-infiltrating lymphocytes, a decrease in T cell receptor-mediated proliferation, and immune evasion of cancer cells. Blocking the interaction between PD-1 and PD-L1 was demonstrated to increase T cell proliferation and cytokine production and to enhance capability of tumor-specific $CD8^+$ T cells, thus contributing to the immune clearance of tumor cells.

Immunohistochemistry has already found PD-1 (on tumor infiltrating lymphocytes) and/or PD-L1 (on tumor cells) in biopsies of many human primary tumors. Such biopsies include lesions of lung cancer, liver cancer, ovarian cancer, cervical cancer, skin cancer, colon cancer, glioma, bladder cancer, breast cancer, kidney cancer, esophageal cancer, gastric cancer, oral squamous cell carcinoma, urothelial carcinoma, pancreatic cancer, and head and neck cancer. PD-1 ligand expression on cells of a variety of tumors is associated with poor prognosis.

In summary, the PD-1/PD-L1 pathway is an evident target for developing antibody therapies for cancers. Thus, there is a need for agents that identify PD-1 and methods for using such agents.

SUMMARY

Provided herein are antibodies and antibody fragments that bind to PD-1.

In some embodiments, the PD-1 antibody or antibody fragment disclosed herein comprises one, two, three, four, five or six CDRs selected from amino acid sequences of SEQ ID NOs: 13, 14, 15, 16, 17, and 18; or an amino acid sequence having one, two, or three conservatively substituted amino acid substitutions compared thereto.

In some embodiments, the antibody or antibody fragment binds to PD-1.

In some embodiments, the antibody or antibody fragment binds to human PD-1 (hPD-1).

In some embodiments, the antibody or antibody fragment blocks the binding of hPD-L1 (human PD-L1) to hPD-1 and/or disrupts hPD-1/hPD-L1 mediated downstream signaling pathways.

In some embodiments, a nucleotide sequence encoding SEQ ID NO: 13 of the above antibodies or antibody fragments is set forth in positions 73-114 of SEQ ID NO: 2.

In some embodiments, a nucleotide sequence encoding SEQ ID NO: 14 of any one of the above antibodies or antibody fragments is set forth in positions 160-177 of SEQ ID NO: 2.

In some embodiments, a nucleotide sequence encoding SEQ ID NO: 15 of any one of the above antibodies or antibody fragments is set forth in positions 271-303 of SEQ ID NO: 2.

In some embodiments, a nucleotide sequence encoding SEQ ID NO: 16 of any one of the above antibodies or antibody fragments is set forth in positions 91-108 of SEQ ID NO: 1.

In some embodiments, a nucleotide sequence encoding SEQ ID NO: 17 of any one of the above antibodies or antibody fragments is set forth in positions 148-192 of SEQ ID NO: 1.

In some embodiments, a nucleotide sequence encoding SEQ ID NO: 18 of any one of the above antibodies or antibody fragments is set forth in positions 292-327 of SEQ ID NO: 1.

In some embodiments, the antibody or antibody fragment disclosed herein comprises one, two, or three heavy-chain CDRs selected from amino acid sequences of SEQ ID NOs: 16, 17, and 18; and/or the antibody or antibody fragment comprises one, two, or three light-chain CDRs selected from amino acid sequences of SEQ ID NOs: 13, 14, and 15.

In some embodiments, the above antibody or antibody fragment comprises light-chain CDRs having amino acid sequences of SEQ ID NOs: 13, 14, and 15, and heavy-chain CDRs having amino acid sequences of SEQ ID NOs: 16, 17, and 18.

In some embodiments, the antibody or antibody fragment is an isolated antibody or antibody fragment.

In some embodiments, the antibody or antibody fragment disclosed herein comprises a heavy-chain variable region and a light-chain variable region; the heavy-chain variable region comprises an amino acid sequence of SEQ ID NO: 7, or an amino acid sequence having at least 90%, at least 95%, at least 98%, or at least 99% sequence identity to the amino acid sequence of SEQ ID NO: 7, or an amino acid sequence having one or more conservative amino acid substitutions compared to the amino acid sequence of SEQ ID NO: 7; and/or the light-chain variable region comprises an amino acid sequence of SEQ ID NO: 8, or an amino acid sequence having at least 90%, at least 95%, at least 98%, or at least 99% sequence identity to the amino acid sequence of SEQ ID NO: 8, or an amino acid sequence having one or more conservative amino acid substitutions compared to the amino acid sequence of SEQ ID NO: 8.

In some embodiments, the antibody or antibody fragment disclosed herein comprises a heavy-chain variable region and a light-chain variable region, the heavy-chain variable region comprising an amino acid sequence of SEQ ID NO: 7 and the light-chain variable region comprising an amino acid sequence of SEQ ID NO: 8.

In some embodiments, a nucleotide sequence encoding SEQ ID NO: 7 of any one of the above antibodies or antibody fragments is set forth in SEQ ID NO: 1, and a nucleotide sequence encoding SEQ ID NO: 8 is set forth in SEQ ID NO: 2.

In some embodiments, the antibody or antibody fragment disclosed herein further comprises a human γ4 heavy-chain constant region or a variant thereof, and/or a human κ light-chain constant region or a variant thereof.

The present disclosure also provides an antibody or antibody fragment comprising a heavy chain and a light chain, the heavy chain comprising an amino acid sequence of SEQ ID NO: 71, an amino acid sequence having at least 90% sequence identity to the amino acid sequence of SEQ ID NO: 71, or an amino acid sequence having one or more conservative amino acid substitutions compared to the amino acid sequence of SEQ ID NO: 71; the light chain comprising an amino acid sequence of SEQ ID NO: 72, an amino acid sequence having at least 90% sequence identity to the amino acid sequence of SEQ ID NO: 72, or an amino acid sequence having one or more conservative amino acid substitutions compared to the amino acid sequence of SEQ ID NO: 72.

In some embodiments, the antibody or antibody fragment disclosed herein comprises a heavy chain set forth in SEQ ID NO: 71 and/or a light chain set forth in SEQ ID NO: 72.

In some embodiments, the antibody or antibody fragment disclosed herein comprises a heavy chain set forth in SEQ ID NO: 71 and a light chain set forth in SEQ ID NO: 72.

In some embodiments, a nucleotide sequence encoding SEQ ID NO: 71 of any one of the above antibodies or antibody fragments is set forth in SEQ ID NO: 73, and a nucleotide sequence encoding SEQ ID NO: 72 is set forth in SEQ ID NO: 74.

In some embodiments, the antibody or antibody fragment disclosed herein is a human antibody or human antibody fragment.

In some embodiments, the above antibody fragment disclosed herein is a Fab, Fv or scFv antibody.

In some embodiments, the antibody or antibody fragment disclosed herein is a monoclonal antibody (including a full-length monoclonal antibody), a polyclonal antibody, or a multispecific antibody (for example, bispecific antibody).

In another aspect, provided is a variant of any of the above antibodies or antibody fragments comprising up to 20, up to 10, up to 5, or up to 3 conservatively substituted amino acid substitutions.

In some embodiments, also provided is a variant of any one of the above antibodies or antibody fragments, comprising one, two, or three conservatively amino acid substitutions, while retaining the same function as the antibodies or antibody fragments.

In another aspect, also provided is a biological material comprising:
  B1) a nucleic acid molecule encoding any one of the above antibodies or antibody fragments or the variants; which can be a DNA, such as cDNA, genomic DNA, or recombinant DNA, or an RNA, such as mRNA or hnRNA;
  B2) an expression cassette, a recombinant vector, a recombinant cell, or a recombinant microorganism containing the nucleic acid molecule of B1).

The biological material is associated with the antibodies or antibody fragments or the variants disclosed herein, and can be used, for example, to produce the antibodies or antibody fragments or the variants disclosed herein.

In some embodiments, provided is a molecule comprising:
  1) a nucleic acid fragment selected from:
    a nucleic acid fragment set forth in positions 91-108 of SEQ ID NO: 1;
    a nucleic acid fragment set forth in positions 148-192 of SEQ ID NO: 1;
    a nucleic acid fragment set forth in positions 292-327 of SEQ ID NO: 1;
    a nucleic acid fragment set forth in positions 73-114 of SEQ ID NO: 2;
    a nucleic acid fragment set forth in positions 160-177 of SEQ ID NO: 2;
    a nucleic acid fragment set forth in positions 271-303 of SEQ ID NO: 2;
    a nucleic acid fragment set forth in SEQ ID NO: 1;
    a nucleic acid fragment set forth in SEQ ID NO: 2;
    a nucleic acid fragment set forth as SEQ ID NO: 73; or
    a nucleic acid fragment set forth in SEQ ID NO: 74;
  2) a nucleic acid fragment hybridizing with the nucleic acid fragment defined in 1) and encoding any one of the antibodies or antibody fragments or the variants disclosed herein;
  3) a nucleic acid fragment having at least 90% sequence identity to the nucleic acid fragment defined in 1) or 2) and encoding any one of the antibodies or antibody fragments or the variants disclosed herein.

The nucleic acid molecule can be used in a part of the biological material.

The term "sequence identity" as used herein can be evaluated visually or using computer software, such as software programs described in Ausubel et. al., Eds. (2007), Current Protocols in Molecular Biology. When a position of compared sequences is occupied by the same base or amino acid, then the molecules are identical at that position. The sequence identity between two or more sequences can be represented by a percentage (%), which can be used to evaluate the identity of related sequences. A polynucleotide sequence or amino acid sequence having a certain percentage (e.g., 90%, 95%, 98%, or 99%) of "sequence identity" to another sequence refers to that when the sequences are aligned, the percentage of bases or amino acids in the sequence are the same.

In some embodiments, treatment with an anti-PD-1 antibody or antibody fragment can be combined with radiotherapy. Radiotherapy induces cancer cell death and increases the availability of tumor antigens for presenting and activating immune cells.

In some embodiments, treatment with the anti-PD-1 antibody or antibody fragment can be combined with surgery to remove cancer cells from a subject.

In other embodiments, the anti-PD-1 antibody or antibody fragment can be combined with a therapy capable of producing a synergistic effect on PD-1 blockade, the therapy including a targeted medication for hormone clearance or inhibiting angiogenesis, or a targeted medication that targets proteins with activity in tumor cells. All of these lead to increased tumor cell death and increased availability of immunostimulatory tumor antigens. Increased T cell activation in combination with anti-PD-1 antibodies or antibody fragments can lead to persistent immune control of cancers.

In some embodiments, the anti-PD-1 antibody or antibody fragment can be combined with another therapeutic antibody for treating cancer or infectious disease. Non-limiting solutions provided are combinations of anti-PD-1 antibody with antibodies targeting Her2/neu or EGF receptors. In another non-limiting embodiment, the anti-PD-1 antibody or antibody fragment is combined with a therapy targeting VEGF or its receptor. In another embodiment, the anti-PD-1 antibody or antibody fragment is combined with anti-CTLA-4 antibody. In yet another non-limiting embodiment, the anti-PD-1 antibody is combined with an antibody targeting RSV.

In another aspect, also provided is a method for producing any one of the antibodies or antibody fragments or the variants, comprising:
a. under a condition for expressing the nucleic acid molecule encoding any one of the antibodies or antibody fragments or the variants, cultivating a recombinant cell containing the nucleic acid molecule to prepare the antibody or antibody fragment or the variant.

In some embodiments, the method further comprises:
b. isolating the antibody or antibody fragment or the variant from the recombinant cell or culture.

In another aspect, further provided is use of any one of the antibodies or antibody fragments or the variants in preparing any one of the products:
(1) a product for detecting PD-1;
(2) a product for stimulating or enhancing immune response;
(3) a product for treating cancer.

In some embodiments, the product for detecting PD-1 is a product for detecting hPD-1, such as a product detecting the expression of hPD-1 in specific cells, tissues, or serum in vitro, or a product detecting hPD-1 in vivo.

In some embodiments, in the product for stimulating or enhancing immune response, the immune cells are in contact with an antigen and the antibody or antibody fragment or the variant, so as to increase the stimulation or to increase the immune response to the antigen.

In some embodiments, the immune response is a T cell-mediated immune response.

In some embodiments, in the product for treating cancer, the cancer is melanoma (e.g., metastatic malignant melanoma), renal carcinoma (e.g., clear cell carcinoma), prostate cancer (e.g., prostate cancer that is difficult to be controlled with hormones), pancreatic cancer, breast cancer, colon cancer, lung cancer (e.g., non-small cell lung cancer), esophageal cancer, head and neck squamous cell carcinoma, liver cancer, ovarian cancer, cervical cancer, thyroid cancer, glioblastoma, glioma, leukemia, lymphoma, and other malignancies.

In another aspect, a pharmaceutical composition is provided, comprising any one of the antibodies or antibody fragments or the variants disclosed herein as a therapeutic active ingredient and a pharmaceutically acceptable excipient, diluent, or carrier, or combinations thereof.

In another aspect, also provided is a method for treating cancer such as the above-mentioned cancers, which comprises administering an effective amount of an antibody or antibody fragment or variant or a pharmaceutical composition disclosed herein to an individual in need thereof. The individual may be, for example, a rodent, canid, pig, primate, or human.

In some embodiments, the antibodies or antibody fragments provided herein bind to hPD-1 with many excellent features including:
1. the antibodies or antibody fragments provided herein bind to hPD-1 with high affinity and can regulate the immune response. Specifically, the antibodies or antibody fragments provided herein can bind to hPD-1 with a $K_D$ of about 20 pM or less.
2. the antibodies or antibody fragments provided herein can bind to hPD-1 with a $k_{on}$ of about $1.98 \times 10^6$ l/Ms or faster.
3. the antibodies or antibody fragments provided herein can dissociate with hPD-1 with a $k_{off}$ of about $4.11 \times 10^5$ l/s or slower. The dissociation rate constant can be measured by biolayer interferometry (such as ForteBio Octet), or surface plasmon resonance technology (such as Biacore).
4. the antibodies or antibody fragments provided herein may also block hPD-L1/hPD-1 binding with an $IC_{50}$ of about 1 nM or less. By any method known in the art the blockade of ligand binding can be measured, and the $IC_{50}$, can be calculated, for example, by FACS method.
5. the antibodies or antibody fragments provided herein can disrupt the hPD-1/hPD-L1-mediated downstream signaling pathway by blocking the binding of hPD-1 and hPD-L1.

DETAILED DESCRIPTION

Figure 1:
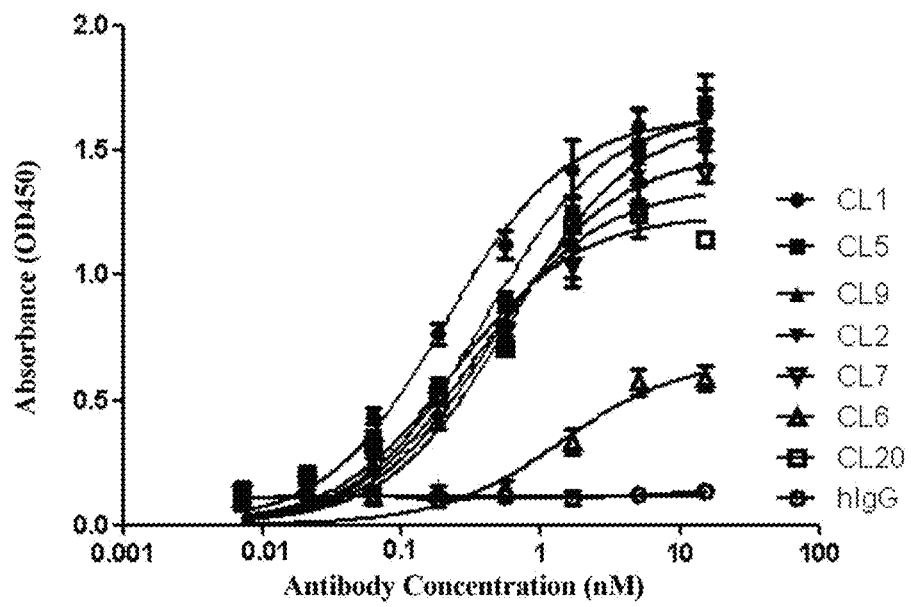
FIG. 1 illustrates dose-dependent binding of anti-hPD-1 antibodies to purified hPD-1 in a protein ELISA.

Unless otherwise stated, the methods used in the following examples are conventional methods.

The materials, reagents, and the like used in the following examples can be commercially available unless otherwise stated.

The present invention is further described below with reference to specific embodiments. It should be understood that the following examples are only used to illustrate the present invention, but not to limit the scope of the present invention.

Abbreviations and Definitions

Unless otherwise stated, the following terms shall have the meanings set forth below. Other terms or abbreviations have the meanings known in the art.

As used herein, unless otherwise stated, the singular forms "a" "an" and "the" include plural reference. Thus, for example, a reference to "an antibody" includes a plurality of antibodies.

"Antibody" refers to any form of an antibody that exhibits a desired biological activity, such as inhibiting the binding of a ligand to its receptor or inhibiting receptor-induced receptor signaling. Therefore, "antibody" is used in its broadest sense and includes, but is not limited to, a monoclonal antibody (including a full-length monoclonal antibody), a polyclonal antibody and a multispecific antibody (such as bispecific antibody), a full human, humanized, primatized or chimeric antibody, a single chain antibody, etc.

"Antibody fragment" refers to a portion of an antibody, such as F(ab')2, F(ab)2, Fab', Fab, Fv, scFv, and the like. Regardless of its structure, the antibody fragment binds to the same antigen recognized by an intact antibody. The term "antibody fragment" includes aptamers, mirror isomers, and bivalent antibodies. The term "antibody fragment" also includes any synthetic or genetically engineered protein that functions as an antibody by binding to a particular antigen to form a complex.

"Fab fragment" consists of CH1 and variable regions of a light chain and a heavy chain. The heavy chain of a Fab molecule cannot form disulfide bonds with another heavy chain molecule.

"Fc region" contains two heavy-chain fragments comprising the CH2 and CH3 domains of an antibody. Two heavy-chain fragments are held together by two or more disulfide bonds and by the hydrophobic interaction of the CH3 domains.

"Fv region" contains variable regions from both heavy and light chains, but lacks constant regions.

"Single-chain Fv antibody" (or "scFv antibody") refers to an antibody fragment comprising the VH and VL domains of an antibody, where these domains are present in a single polypeptide chain. In general, Fv polypeptides additionally include a polypeptide linker between the VH and VL domains, which allows the scFv to form the desired structure for antigen binding. For a review of scFv, see U.S. Pat. No. 6,423,538.

Those skilled in the art will understand that the classes of antibody heavy chains include gamma, mu, alpha, delta, and epsilon ($\gamma$, $\mu$, $\alpha$, $\delta$, and $\epsilon$), and some subclasses (e.g., $\gamma 1$-$\gamma 4$). The nature of this chain determines the "type" of the antibody as IgG, IgM, IgA, IgD, or IgE. Immunoglobulin subclasses (isotypes), such as IgG1, IgG2, IgG3, IgG4, IgG5, etc., have been well characterized and the functional specificity imparted is also known. All types of immunoglobulins are within the scope of the present invention. In some embodiments, the immunoglobulin molecule is an IgG species. IgG typically contains two identical light chain polypeptides with a molecular weight of about 23,000 Daltons and two identical heavy chain polypeptides with a molecular weight of about 53,000-70,000. These four chains are connected in a "Y" configuration through disulfide bonds, wherein the light chain starts at the opening of "Y" configuration and extends through the variable region to surround the heavy chain. Antibodies in IgG4 form are a subclass of IgG, with their heavy chains being the $\gamma 4$ subtype. In some embodiments, the antibody disclosed herein is IgG4.

"Hypervariable region" refers to amino acid residues of an antibody responsible for antigen binding. Hypervariable regions include amino acid residues from "complementarity determining regions" or "CDRs" defined by sequence alignments. "Framework" residues or "FR" residues are variable domain residues other than hypervariable region residues as defined herein.

The antibodies disclosed herein may be derived from any animal, including birds and mammals. Preferably, the antibody is derived from a human, a mouse, a donkey, a rabbit, a goat, a camel, a llama, a horse, or a chicken source. In another embodiment, the variable region may come from a condricthoid source (e.g., from a shark). A "human antibody" is an antibody whose amino acid sequence corresponds to that of an antibody produced by a human, and/or an antibody that has been prepared using any of the techniques used to produce human antibodies as shown herein. This definition explicitly excludes humanized antibodies that comprise non-human antigen-binding residues.

"Isolated antibody" is an antibody that is separated from all or part of natural environment components. The contaminating component of its natural environment, including enzymes, hormones, and other proteinaceous or non-proteinaceous solutes, may interfere with the diagnostic or therapeutic application of the antibody. In some embodiments, the antibody is purified to the extent: (1) more than 95% by weight of the antibody, such as more than 99% by weight, as determined by the Lowry method; (2) sufficient to obtain at least 15 residues at the N-terminus or in internal amino acid sequence by use of a spinning cup sequenator; or (3) homogeneity by SDS-PAGE under reducing or non-reducing conditions with Coomassie blue or silver staining. Isolated antibodies include antibodies in situ within a recombinant cell, wherein at least one component of the antibody's natural environment is not present. Isolated antibodies are usually prepared by at least one purification step. In some embodiments, the purity of the isolated antibody is at least about 50%, about 60%, about 70%, about 80%, about 90%, about 95%, about 99%, or within the range between any two of these values (inclusive), or any values therein.

"Nucleic acid" or "polynucleotide" refers to a polymer molecule consisting of single nucleotides: adenine (a), cytosine (c), guanine (g), thymine (t) (or uracil (u) in RNA), such as DNA, RNA, or modifications thereof. The nucleic acid molecule may be a natural nucleic acid molecule, a synthetic nucleic acid molecule, or a combination of one or more natural nucleic acid molecules and one or more synthetic nucleic acid molecules. Examples of nucleic acids include, but are not limited to: genes or gene fragments (such as probes, primers, EST or SAGE tags), exons, introns, messenger RNA (mRNA), transport RNA, ribosomal RNA, ribozymes, cDNA, dsRNA, siRNA, miRNA, recombinant polynucleotides, branched polynucleotides, plasmids, vectors, isolated DNA of any sequence, isolated RNA of any sequence, nucleic acid probes, and primers.

"Isolated nucleic acid molecule" is a nucleic acid molecule that has been identified and separated from at least one contaminating nucleic acid molecule. An isolated nucleic acid molecule is different from its naturally occurring form or environment. Therefore, an isolated nucleic acid molecule is distinguished from a nucleic acid molecule that is present in its natural cells. However, an isolated nucleic acid molecule includes a nucleic acid molecule contained in a cell that normally expresses an antibody, for example, the chromosome position of the nucleic acid molecule is different from that in a natural cell.

"Monoclonal antibody" refers to an antibody obtained from a substantially homogeneous antibody population, and the individual antibodies that make up the population are identical. Monoclonal antibodies are highly specific and can be directed against a single antigenic site. Furthermore, in contrast to conventional (polyclonal) antibody preparations, which typically include multiple different antibodies directed against multiple different determinants (epitopes), each monoclonal antibody is only directed against a single determinant of the antigen.

"Immune cells" include cells that are of hematopoietic origin and play a role in immune response. Immune cells include: B lymphocytes and T lymphocytes; natural killer cells; and monocytes, macrophages, eosinophils, mast cells, basophils, and granulocytes.

As used herein, "variant" of a sequence refers to a sequence that differs from the sequence shown at one or more amino acid residues but retains the same biological activity for the resulting molecule as the sequence shown.

"Amino acid" refers to an organic compound containing both an amino group and a carboxyl group, such as an alpha-amino acid that can be encoded by a nucleic acid directly or in the form of a precursor. A single amino acid is encoded by a nucleic acid consisting of three nucleotides (so-called codon or base triplet). The same amino acid can be encoded by different codons, which is known as "codon degeneracy". Amino acids include natural amino acids and non-natural amino acids. Natural amino acids include alanine (three-letter code: ala, one-letter code: A), arginine (arg, R), asparagine (asn, N), aspartic acid (asp, D), cysteine (cys, C), glutamine (gln, Q), glutamic acid (glu, E), glycine (gly, G), histidine (his, H), isoleucine (ile, I), leucine (leu, L), lysine (lys, K), methionine (met, M), phenylalanine (phe, F), proline (pro, P), serine (ser, S), threonine (thr, T), tryptophan (trp, W), tyrosine (tyr, Y), and valine (val, V).

"Conservatively-substituted variants" or "conservative amino acid substitutions" refer to amino acid substitutions known to those skilled in the art, and such substitutions generally do not alter the biological activity of the resulting molecule. In general, it is commonly recognized by those skilled in the art that a single amino acid substitution in a non-essential region of a polypeptide will not substantially alter the biological activity of the polypeptide. The conservative substitution can be a substitution by an amino acid with a side chain of similar chemical properties, such as: 1) an aliphatic side chain: glycine, alanine, valine, leucine, and isoleucine; 2) an aliphatic hydroxyl side chain: serine and threonine; 3) an amide-containing side chain: asparagine and glutamine; 4) an aromatic side chain: phenylalanine, tyrosine, and tryptophan; 5) a basic side chain: lysine, arginine, and histidine; and 6) an acidic side chain: aspartic acid and glutamine.

As used herein, the term "about" means that a value is within an acceptable error range of the particular value as determined by one of ordinary skill in the art, and the value depends in part on how to measure or determine (i.e., the limits of the measurement system). Alternatively, "about" may mean a range of up to ±20%, such as a range of ±10%, ±5%, or ±1%. Unless otherwise stated, when a specific value appears in the application and the claims, "about" should be assumed to mean that it is within an acceptable error range for that specific value.

When referring to a ligand/receptor binding pair, an antibody/antigen binding pair, or other binding pairs, "specific" binding refers to determining whether there is the binding reaction of a protein such as PD-1 in a heterogeneous population of the protein and/or other biological agents. Therefore, under the given conditions, a specific ligand/antigen binds to a specific receptor/antibody and does not significantly bind to other proteins present in the sample. Specific binding can be described by the equilibrium dissociation constant ($K_D$). A smaller $K_D$ means a tighter binding. Methods for determining whether two molecules specifically bind to each other are well known in the art, and include, for example, equilibrium dialysis, surface plasmon resonance, biofilm layer interferometry, and the like. Antibodies that "specifically bind" to PD-1 include antibodies that have an equilibrium dissociation constant $K_D$ of less than or equal to about 100 nM, less than or equal to about 10 nM, less than or equal to about 5 nM, or less than or equal to about 1 nM with PD-1.

As used herein, the term "biological material" includes, but is not limited to, a nucleic acid molecule, an expression cassette, a recombinant vector, a recombinant cell, or a recombinant microorganism.

When "administer" and "treat" involves an animal, a human, a subject, a cell, a tissue, an organ, or a biological fluid, it refers to contacting an exogenous medicament, a therapeutic agent, a diagnostic agent or a composition with the animal, the human, the subject, the cell, the tissue, the organ, or the biological fluid. "Administer" and "treat" may refer to, for example, a treatment method, a pharmacokinetic method, a diagnostic method, a research method, and an experimental method. Treating cells includes contacting an agent with cells and contacting the agent with a fluid, wherein the fluid is in contact with cells. "Administer" and "treat" also mean in-vitro and ex-vivo treatment of cells, for example, by an agent, a diagnostic agent, a binding composition, or other cells.

As used herein, "inhibit" or "treat" or "treatment" involves delaying the development of symptoms associated with a disease and/or alleviating the severity of these symptoms that the disease develops or is expected to develop. The term also involves alleviating existing symptoms, preventing additional symptoms, and alleviating or preventing underlying causes of these existing symptoms. Thus, the term indicates that a beneficial result has been imparted to a vertebrate subject with a disease, such as a human.

As used herein, the term "therapeutically effective amount" or "effective amount" refers to an amount of the anti-PD-1 antibody that can effectively prevent or alleviate the disease or disorder to be treated when the anti-PD-1 antibody or the fragment thereof is administered alone or in combination with another therapeutic agent to a cell, a tissue, or a subject in that amount. A therapeutically effective amount further refers to an amount of the antibody or the fragment thereof that is sufficient to cause a reduction in symptoms, for example, treating, curing, preventing, or alleviating a related medical state, or increasing the treatment rate, cure rate, prevention rate, or alleviation rate for the symptom. The effective amount for a particular subject can vary depending on a variety of factors, such as the disease to be treated, the overall health of a patient, the route and dose of administration, and the severity of a side effect. An effective amount can be the maximum dose or administration regimen that avoids significant side effects or toxic effects. When an active ingredient is administered to an individual alone, a therapeutically effective amount refers to the amount of that individual ingredient. When a combination is administered, a therapeutically effective amount refers to the combined amount of active ingredients that produces a therapeutic effect, regardless of whether these active ingredients are administered in combination, continuously, or simultaneously. A therapeutically effective amount may reduce symptoms by at least 10%, generally at least 20%, preferably at least about 30%, more preferably at least 40%, and most preferably at least 50%. In some embodiments, the effective amount of the anti-PD-1 antibody or a fragment thereof is 0.01 mg to 1 g. In some embodiments, the effective amount of the anti-PD-1 antibody or a fragment thereof is 10 mg to 750 mg. The antibodies described herein can be administered by conventional methods, such as intravenous or subcutaneous injection.

Monoclonal Antibody

Monoclonal antibodies for PD-1 can be prepared according to knowledge and skills in the art, and antibodies or antibody fragments can be isolated from scFv yeast display libraries.

DNA encoding the monoclonal antibody can be easily isolated and sequenced by conventional methods. Once the DNA is isolated, it can be placed in an expression vector, and the vector is then transfected into a host cell to achieve the synthesis of monoclonal antibodies in a recombinant host cell. The host cell is, for example, an *E. coli* cell, a simian COS cell, a Chinese Hamster Ovary (CHO) cell, or a myeloma cell that does not otherwise produce an immunoglobulin. Recombinant production of the antibody will be described in greater detail below.

Chimeric Antibody

DNA of the antibody can also be modified, for example, by using coding sequences for human heavy and light chain constant domains to replace the homologous mouse sequences, or by combining a sequence encoding an immunoglobulin with all or part of a sequence encoding a non-immunoglobulin substance (such as a protein domain) with covalent linkages. The non-immunoglobulin substance is usually used to replace the constant domain of an antibody or the variable domain of an antigen-binding site of the antibody to generate a chimeric bivalent antibody, and the chimeric bivalent antibody contains one antigen-binding site having specificity for an antigen and another antigen-binding site having specificity for a different antigen.

Antibody Purification

With a recombinant technology, the antibody can be produced intracellularly or in the periplasmic space, or secreted directly into the culture. If the antibody is produced intracellularly or in the periplasmic space, the cell slurry is frozen and thawed repeatedly in the presence of sodium acetate (pH 3.5), EDTA, and phenylmethylsulfonyl fluoride (PMSF) in about 30 minutes, and then cell debris is removed by centrifugation. If the antibody is secreted into the culture, the supernatant from the expression system can be first concentrated using a commercially-available protein concentration filter (such as an Amicon or Millipore Pellicon ultrafiltration unit). In any of the aforementioned steps, a protease inhibitor (such as PMSF) can be used to inhibit the proteolysis, and an antibiotic can be used to prevent the growth of foreign contaminants.

An antibody composition can be prepared from cells using, for example, hydroxyapatite, gel electrophoresis, dialysis, and affinity chromatography, wherein the affinity chromatography is a preferred purification technique. Whether protein A is suitable as an affinity ligand depends on the type and the isotype of the immunoglobulin Fc region present in the antibody. Protein A can be used for the purification of antibodies based on human γ1, γ2 or γ4 heavy chains (Lindmark et al., 1983, J. Immunol. Meth. 62: 1-13). The matrix to which the affinity ligand is attached is usually agarose, but other matrices can also be used. Mechanically stable matrices, such as controlled porosity glass or poly(styrene-divinylbenzene), can achieve a higher flow rate and a shorter processing time than agarose can achieve. If the antibody contains a CH3 domain, it can be purified using Bakerbond ABX™ resin. Depending on the antibody to be recovered, other protein purification techniques can be used, such as fractionation on an ion exchange column, ethanol precipitation, reverse-phase HPLC, anion or cation exchange resin (e.g., polyaspartic acid column) chromatography, chromatofocusing, and SDS-PAGE.

Therapeutic Use of Antibodies and Antibody Fragments Disclosed Herein

The antibodies or antigen-binding fragments disclosed herein that specifically bind to PD-1 can be used for stimulating or enhancing an immune response. The antibodies and antibody fragments disclosed herein are particularly suitable for treating a subject suffering from a disease that can be treated by increasing a T cell-mediated immune response. In some embodiments, the subject includes a human patient in need of an increased immune response.

In some embodiments, provided is a method for treating disease that can be treated by increasing a T cell-mediated immune response, the method comprising administered to a patient in need thereof a therapeutically effective amount of an antibody or antigen-binding fragment disclosed herein. In some embodiments, the disease that can be treated by increasing a T cell-mediated immune response is a cancer.

Cancer

The antibodies or antigen-binding fragments disclosed herein can be used for treating a cancer (i.e., inhibiting the growth or survival of tumor cells). In some embodiments, cancers whose growth can be inhibited with the antibodies disclosed herein include cancers that generally respond to an immunotherapy, but also include cancers that have not yet been associated with an immunotherapy so far. In some embodiments, non-limiting examples of cancers include melanoma (e.g., metastatic malignant melanoma), renal carcinoma (e.g., clear cell carcinoma), prostate cancer (e.g., prostate cancer that is difficult to be controlled with hormones), pancreatic cancer, breast cancer, colon cancer, lung cancer (e.g., non-small cell lung cancer), esophageal cancer, head and neck squamous cell carcinoma, liver cancer, ovarian cancer, cervical cancer, thyroid cancer, glioblastoma, glioma, leukemia, lymphoma, and other malignancies. In some embodiments, the cancer is a refractory or relapsed cancer that can be inhibited by the antibodies or antigen-binding fragments.

Non-Therapeutic Use of the Antibodies and Antibody Fragments

Anti-PD-1 antibody products for non-therapeutic use already exist, such as the anti-hPD-1 monoclonal antibody Mab1086 commercially available from R&D Systems of Minneapolis, MN, USA, which can be used for flow cytometry, Western Blot, and ELISA. The antibodies disclosed herein can be used for any non-therapeutic purpose provided by Mab1086.

The antibodies disclosed herein can be used for diagnostic assay, for example, for detecting the expression of PD-1 in specific cells, tissues, or serum. For diagnostic use, the antibody is usually labeled (directly or indirectly) with a detectable moiety. Numerous labels are available, generally comprising the following categories: biotin, fluorochrome, radionucleotide, enzyme, iodine, and a biosynthetic label.

The antibodies of the invention can also be used for in-vivo diagnostic assays. The antibodies are usually labeled with a radionuclide (e.g., $^{111}$In, $^{99}$Tc, $^{4}$C, $^{125}$I, $^{3}$H, $^{32}$P, $^{35}$S, or $^{18}$F) so that antigens or cells that express the antibodies can be localized by immunoscintiography or positron emission tomography.

Pharmaceutical Compositions

Also provided are pharmaceutical compositions. Such compositions comprise an effective dose of an antibody or antibody fragment and a pharmaceutically acceptable carrier.

In some embodiments, the term "pharmaceutically acceptable carrier" refers to a substance approved by a government regulatory agency or listed in other commonly-recognized pharmacopeias for use in animals, and particularly in humans. In addition, the "pharmaceutically acceptable carrier" may be any type of non-toxic solid, semi-solid or liquid filler, diluent, an encapsulating material, or a formulation additive.

The term "carrier" refers to a diluent, adjuvant, excipient, or carrier that is administered with an active ingredient for treatment. Such pharmaceutical carriers can be sterile liquids, such as water and oils, including oils originated from petroleum, animal, plant or synthesis, such as peanut oil, soybean oil, mineral oil, sesame oil, and the like. In some embodiments, when the pharmaceutical composition is administered intravenously, the carrier can be water. A saline aqueous solution, a glucose aqueous solution, and a glycerol solution can also be used as a liquid carrier, especially for injection. Examples of suitable pharmaceutical carriers are described in Remington's Pharmaceutical Sciences by E. W. Martin, which is hereby incorporated herein by reference. Such compositions will contain a clinically effective dose of an antibody or antibody fragment and a suitable carrier, to provide a form suitable for administration to a patient. The formulation should be suitable for the administration mode. The formulation can be encapsulated in an ampoule bottle, a disposable syringe, or a multi-dose vial made of glass or plastic.

In some embodiments, the composition is formulated into a pharmaceutical composition suitable for intravenous injection into a human body according to conventional steps. A composition for intravenous administration is usually a solution in sterile isotonic aqueous buffer. The pharmaceutical composition may also include a solubilizer and a local anesthetic, such as lidocaine, to alleviate the pain at the injection site. In general, the active ingredients are provided in a unit dosage form individually or as a mixture, for example, the active ingredients are encapsulated in sealed containers (such as ampoule bottles or sachets) that can indicate the amount of the active agent, in the form of lyophilized powder or anhydrous concentrate. Where the composition is administered by infusion, the composition can be dispensed in infusion bottles containing sterile, pharmaceutical grade water or saline. Where the composition is administered by injection, an ampoule bottle containing sterile water or saline for injection can be used, so that the active ingredients can be mixed before administration.

The antibodies or antibody fragments provided herein include salt forms thereof. Pharmaceutically acceptable salts include salts of anions derived from acids such as hydrochloric acid, phosphoric acid, acetic acid, oxalic acid, tartaric acid, and the like; and salts of cations derived from sodium, potassium, ammonium, calcium, iron, isopropylamine, triethylamine, 2-ethylaminoethanol, histidine, procainecations, and the like.

Reagents or Materials hPD-1 was obtained from Sino Biological Inc., Catalog No.: 10377-H03H-B.

hIgG was obtained from Nanjing Genscript Biotechnology Co., Ltd., Catalog No.: A01006.

hPD-1-expressing Jurkat cells were obtained from Promega, Catalog No.: J1252.

Unlabeled hPD-L1 was obtained from Sino Biological Inc., Catalog No.: 10084-HNAH.

PE-labeled goat anti-human Fc was obtained from Thermo Fisher Scientific, Catalog No.: 12-4998-82.

CHO-K1 cells were obtained from Promega, Catalog No.: J1252.

F-12 was obtained from Thermo Fisher Scientific, Catalog No.: 11765062.

Bio-Glo Luciferase Assay System was obtained from Promega, Catalog No.: G7940.

Example 1: Preparation and Sequencing of the Anti-hPD-1 Antibodies

First, human VL and VH cDNAs were prepared based on human lymphocyte mRNAs, and then a scFv yeast display library was established. The CL1 and CL1-related antibodies disclosed herein were isolated by screening the library. The methodologies for establishing and screening such libraries are known in the art. Methods and reagents particularly suitable for the establishment and screening of antibody display libraries can be found in the following document: such as U.S. Pat. No. 6,423,538 of Wittrup et al.

The DNA sequences encoding the scFv variable regions expressed by yeast were determined by gene sequencing. The results of each sequencing reaction for each clone were analyzed with Seqman. The sequences are disclosed in the Sequence Listing and listed in Table 1.

TABLE 1

DNA or amino acid sequences of the anti-hPD-1 antibodies

| SEQ ID NO: | Description | Sequence |
|---|---|---|
| 1 | CL1 heavy-chain variable region (DNA) | caggtgcagctggtg cagtccggcgtggag gtgaagaagcctggc gccagcgtgaaggtg tcctgtaaggccagc ggctacaccttcacc aattactatatgtat tgggtgcggcaggcc cccggccagggactg gagtggatgggaggc atcaatcccagcaac ggcggcaccaacttc aatgagaagtttaag aaccgggtgaccctg accaccgatagcagc accaccaccgcttac atggagctgaagagc ctgcagtttgacgat accgctgtgtactat tgcgctgcccgggat caggctggacatggg cttcgagttctgggg ccagggcaccaccgt gaccgtgtccagc |
| 2 | CL1 light-chain variable region (DNA) | gagatcgtgctgacc cagtccccgctacc ctgagcctgtccccc ggagagcgggctacc ctgtcttgtcgggcc tccaagggcgtgagc accagcggatactcc tatctgcactggtac cagcagaagcccggc caggctcccaggctg |

TABLE 1-continued

DNA or amino acid sequences of the anti-hPD-1 antibodies

| SEQ ID NO: | Description | Sequence |
|---|---|---|
| | | ctgatctacctggct tcctacctggagagc ggcgtgcccgctagg tttagcggcagcggc agcggaaccgatttc accctgaccatcagc tccctggagcccgag gattttgccgtgtac tactgccagcacgct tacgacctgccctg acctttggcggcggc accaaggtggagatc aag |
| 3 | CL5 heavy-chain variable region (DNA) | caagttcaattagtc caaagtggtgtcgaa gtaaagaagccaggt gcctcagtcaaagtc agttgtaaagcctca ggttatacatttaca aactactacatgtac tgggttagacaagcc ccaggtcaaggtttg gaatggatgggtggt atcaatccttcaaac ggtggcaccaacttc aacgaaaagttcaag aacagagtaactttg actacagattcttca accactacagcatac atggaattgaaatct ttacaattcgatgac acagctgtttactac tgtgcagcgcgtgat tacagattcgacatg ggtttcgaatactgg ggtcaaggtaccact gttactgtctcctct |
| 4 | CL5 light-chain variable region (DNA) | gaaattgtcttgact caatctccagctaca ttgtccttaagtcct ggtgaaagagccaca ttgtcatgcagagct tccaaaggtgtatct acctcaggttactct tacttgcattggtat caacaaaagccaggt caagcacctagattg ttgatctacttggcc agttacttggaatct ggtgttccagctaga ttttccggtagtggt tctggtactgacttc acattgaccatatct tcattagaacctgaa gatttcgcagtctat tactgccaacattct tatgaccttccactt acattcggaggtggt acaaaggtagaaata aaa |
| 5 | CL9 heavy-chain variable region (DNA) | caagttcaattagtc caaagtggtgtcgaa gtaaagaagccaggt gcctcagtcaaagtc agttgtaaagcctca ggttatacatttaca aactactacatgtac tgggttagacaagcc ccaggtcaaggtttg gaatggatgggtggt atcaatccttcaaac |

TABLE 1-continued

DNA or amino acid sequences of the anti-hPD-1 antibodies

| SEQ ID NO: | Description | Sequence |
|---|---|---|
| | | ggtggcaccaacttc aacgaaaagttcaag aacagagtaactttg actacagattcttca accactacagcatac atggaattgaaatct ttacaattcgatgac acagctgtttactac tgtgcagcacgtgat tacaaattcgacatg ggtttcgaattctgg ggtcaaggtaccact gttactgtctcctct |
| 6 | CL9 light-chain variable region (DNA) | gaaattgtcttgact caatctccagctaca ttgtccttaagtcct ggtgaaagagccaca ttgtcatgcagagct tccaaaggtgtatct acctcaggttactct tacttgcattggtat caacaaaagccaggt caagcacctagattg ttgatctacttggcc agttacttggaatct ggtgttccagctaga ttttccggtagtggt tctggtactgacttc acattgaccatatct tcattagaacctgaa gatttcgcagtctat tattgccaacattcc tatggccttccagtt acattcggtggtggt acaaaggtagaaata aaa |
| 7 | CL1 heavy-chain variable region (AA) | QVQLVQSGVEVKKPG ASVKVSCKASGYTFT NYYMYWVRQAPGQGL EWMGGINPSNGGTNF NEKFKNRVTLTTDSS TTTAYMELKSLQFDD TAVYYCAARDYRLDM GFEFWGQGTTVTVSS |
| 8 | CL1 light-chain variable region (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHAYDLPLTFGGG TKVEIK |
| 9 | CL5 heavy-chain variable region (AA) | QVQLVQSGVEVKKPG ASVKVSCKASGYTFT NYYMYWVRQAPGQGL EWMGGINPSNGGTNF NEKFKNRVTLTTDSS TTTAYMELKSLQFDD TAVYYCAARDYRFDM GFEYWGQGTTVTVSS |
| 10 | CL5 light-chain variable region (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHSYDLPLTFGGG TKVEIK |

TABLE 1-continued

DNA or amino acid sequences of the anti-hPD-1 antibodies

| SEQ ID NO: | Description | Sequence |
|---|---|---|
| 11 | CL9 heavy-chain variable region (AA) | QVQLVQSGVEVKKPGASVKVSCKASGYTFTNYYMYWVRQAPGQGLEWMGGINPSNGGTNFNEKFKNRVTLTTDSSTTTAYMELKSLQFDDTAVYYCAARDYKFDMGFEFWGQGTTVTVSS |
| 12 | CL9 light-chain variable region (AA) | EIVLTQSPATLSLSPGERATLSCRASKGVSTSGYSYLHWYQQKPGQAPRLLIYLASYLESGVPARFSGSGSGTDFTLTISSLEPEDFAVYYCQHSYGLPVTFGGGTKVEIK |
| 13 | CL1 light-chain CDR1 (AA) | ASKGVSTSGYSYLH |
| 14 | CL1 light-chain CDR2 (AA) | LASYLE |
| 15 | CL1 light-chain CDR3 (AA) | YCQHAYDLPLT |
| 16 | CL1 heavy-chain CDR1 (AA) | NYYMYW |
| 17 | CL1 heavy-chain CDR2 (AA) | GINPSNGGTNFNEKF |
| 18 | CL1 heavy-chain CDR3 (AA) | ARDYRLDMGFEF |
| 19 | CL5 light-chain CDR1 (AA) | ASKGVSTSGYSYLH |
| 20 | CL5 light-chain CDR2 (AA) | LASYLE |
| 21 | CL5 light-chain CDR3 (AA) | YCQHSYDLPLT |
| 22 | CL5 heavy-chain CDR1 (AA) | NYYMYW |
| 23 | CL5 heavy-chain CDR2 (AA) | GINPSNGGTNFNEKF |
| 24 | CL5 heavy-chain CDR3 (AA) | ARDYRFDMGFEY |
| 25 | CL9 light-chain CDR1 (AA) | ASKGVSTSGYSYLH |
| 26 | CL9 light-chain CDR2 (AA) | LASYLE |
| 27 | CL9 light-chain CDR3 (AA) | YCQHSYGLPVT |
| 28 | CL9 heavy-chain CDR1 (AA) | NYYMYW |
| 29 | CL9 heavy-chain CDR2 (AA) | GINPSNGGTNFNEKF |
| 30 | CL9 heavy-chain CDR3 (AA) | ARDYKFDMGFEF |
| 31 | CL2 heavy-chain variable region (DNA) | caagttcaattagtccaaagtggtgtcgaagtaaagaagccaggtgcctcagtcaaagtcagttgtaaagcctcaggttatacatttacaaactactacatgtactgggttagacaagccccaggtcaaggtttggaatggatgggtggtatcaatccttcaaacggtggcaccaacttcaacgaaaagttcaagaacagagtaactttgactacagattcttcaaccactacagcatacatggaattgaaatcttacaattcgatgacacagctgtttactactgtgcagcccgtgattacaaattcgacatgggtttcgagtactggggtcaaggtaccactgttactgtctcctct |
| 32 | CL2 light-chain variable region (DNA) | gaaattgtcttgactcaatctccagctacattgtccttaagtcctggtgaaagagccacattgtcatgcagagctccaaaggtgtatctacctcaggttactcttacttgcattggtatcaacaaaagccaggtcaagcacctagattgttgatctacttggccagttacttggaatctggtgttccagctagattttccggtagtggttctggtactgacttcacattgaccatatcttcattagaacctgaagatttcgcagtctattattgccaacattcctatggtcttccacttacattcggtggtggtacaaaggtagaaataaaa |
| 33 | CL7 heavy-chain variable region (DNA) | caagttcaattagtccaaagtggtgtcgaagtaaagaagccaggtgcctcagtcaaagtcagttgtaaagcctcaggttatacatttacaaactactacatgtactgggttagacaagccccaggtcaaggtttggaatggatgggtggtatcaatccttcaaacggtggcaccaacttcaacgaaaagttcaagaacagagtaactttgactacagattcttcaaccactacagcatacatggaattgaaatcttacaattcgatgacacagctgtttactactgtgcagcccgtgattaccgattcgacatgggtttcgagttttggggtcaaggtaccactgttactgtctcctct |

TABLE 1-continued

DNA or amino acid sequences of the anti-hPD-1 antibodies

| SEQ ID NO: | Description | Sequence |
|---|---|---|
| 34 | CL7 light-chain variable region (DNA) | gaaattgtcttgact caatctccagctaca ttgtccttaagtcct ggtgaaagagccaca ttgtcatgcagagct tccaaaggtgtatct acctcaggttactct tacttgcattggtat caacaaaagccaggt caagcacctagattg ttgatctacttggcc agttacttggaatct ggtgttccagctaga ttttccggtagtggt tctggtactgacttc acattgaccatatct tcattagaacctgaa gatttcgcagtctat tattgccaacattcc tatagtttcccactc acattcggtggtggt acaaaggtagaaata aaa |
| 35 | CL6 heavy-chain variable region (DNA) | caagttcaattagtc caaagtggtgtcgaa gtaaagaagccaggt gcctcagtcaaagtc agttgtaaagcctca ggttatacatttaca aactactacatgtac tgggttacacaagcc ccaggtcaaggtttg gaatggatgggtggt atcaatccttcaaac ggtggcaccaacttc aacgaaaagttcaag aacagagtaacttg actacagattcttca accactacagcatac atggaattgaaatct ttacaattcgatgac acagctgtttactac tgtgcagcccgtgat tacagatttgacatg ggtttcgagttctgg ggtcaaggtaccact gttactgtctcctct |
| 36 | CL6 light-chain variable region (DNA) | gaaattgtcttgact caatctccagctaca ttgtccttaagtcct ggtgaaagagccaca ttgtcatgcagagct tccaaaggtgtatct acctcaggttactct tacttgcattggtat caacaaaagccaggt caagcacctagattg ttgatctacttggcc agttacttggaatct ggtgttccagctaga tgttccggtagtggt tctggtactgacttc acattgaccatatct tcattagaacctgaa gatgtcgcagtctat tattgccaacattcc tatgacctccacttt acattcggtggtggt acaaaggtagagata aaa |

TABLE 1-continued

DNA or amino acid sequences of the anti-hPD-1 antibodies

| SEQ ID NO: | Description | Sequence |
|---|---|---|
| 37 | CL2 heavy-chain variable region (AA) | QVQLVQSGVEVKKPG ASVKVSCKASGYTFT NYYMYWVRQAPGQGL EWMGGINPSNGGTNF NEKFKNRVTLTTDSS TTTAYMELKSLQFDD TAVYYCAARDYKFDM GFEYWGQGTTVTVSS |
| 38 | CL2 light-chain variable region (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHSYGLPLTFGGG TKVEIK |
| 39 | CL7 heavy-chain variable region (AA) | QVQLVQSGVEVKKPG ASVKVSCKASGYTFT NYYMYWVRQAPGQGL EWMGGINPSNGGTNF NEKFKNRVTLTTDSS TTTAYMELKSLQFDD TAVYYCAARDYRFDM GFEFWGQGTTVTVSS |
| 40 | CL7 light-chain variable region (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHSYSFPLTFGGG TKVEIK |
| 41 | CL6 heavy-chain variable region (AA) | QVQLVQSGVEVKKPG ASVKVSCKASGYTFT NYYMYWVRQAPGQGL EWMGGINPSNGGTNF NEKFKNRVTLTTDSS TTTAYMELKSLQFDD TAVYYCAARDYRFDM GFEFWGQGTTVTVSS |
| 42 | CL6 light-chain variable region (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHSYDLPLTFGGG TKVEIK |
| 43 | CL2 light-chain CDR1 (AA) | ASKGVSTSGYSYLH |
| 44 | CL2 light-chain CDR2 (AA) | LASYLE |
| 45 | CL2 light-chain CDR3 (AA) | YCQHSYGLPLT |
| 46 | CL2 heavy-chain CDR1 (AA) | NYYMYW |
| 47 | CL2 heavy-chain CDR2 (AA) | GINPSNGGTNFNEKF |
| 48 | CL2 heavy-chain CDR3 (AA) | ARDYKFDMGFEY |
| 49 | CL7 light-chain CDR1 (AA) | ASKGVSTSGYSYLH |

TABLE 1-continued

DNA or amino acid sequences of the anti-hPD-1 antibodies

| SEQ ID NO: | Description | Sequence |
|---|---|---|
| 50 | CL7 light-chain CDR2 (AA) | LASYLE |
| 51 | CL7 light-chain CDR3 (AA) | YCQHSYSFPLT |
| 52 | CL7 heavy-chain CDR1 (AA) | NYYMYW |
| 53 | CL7 heavy-chain CDR2 (AA) | GINPSNGGTNFNEKF |
| 54 | CL7 heavy-chain CDR3 (AA) | ARDYRFDMGFEF |
| 55 | CL6 light-chain CDR1 (AA) | ASKGVSTSGYSYLH |
| 56 | CL6 light-chain CDR2 (AA) | LASYLE |
| 57 | CL6 light-chain CDR3 (AA) | YCQHSYDLPLT |
| 58 | CL6 heavy-chain CDR1 (AA) | NYYMYW |
| 59 | CL6 heavy-chain CDR2 (AA) | GINPSNGGTNFNEKF |
| 60 | CL6 heavy-chain CDR3 (AA) | ARDYRFDMGFEF |
| 61 | CL20 heavy-chain variable region (DNA) | caggtgcagctggtgcagtcaggggtggaggtcaaaaagcccggtgcctcagtcaaagtgtcttgtaaagcctctggatatacatttactaactactatatgtactgggtgaggcaggccaggacagggtctgagtggatgggcggaatcaaccctctaatggggtaccaacttcaacgaaaagtttaaaaaccgggtgacactgaccacagattccagcactaccacagcctatatggagctgaagtccctgcagttcgacgatacagcagtgtactattgcgcaggcgggactacagattcgatatgggctttgactattggggccaggaactaccgtcaccgtgtctagt |
| 62 | CL20 light-chain variable region (DNA) | gaaattgtgctgaccagagccccgccactctgtctctgagtccaggagagagggccacctgtcatgccagcttccaagggcgtgtccacctccggctacagttatctgcactggtaccagcagaaacccggacaggcacctagactgctgatctacctggccagctatctggaatctggcgtgccagctaggttcagcggctctggaagtgggaccgactttaccctgacaatttccagcctggagcccgaagatttcgcagtctactattgccagcattctcgtgacctgcccctgacattcggcggtggacaaaagtggaaatcaag |
| 63 | CL20 heavy-chain variable region (AA) | QVQLVQSGVEVKKPGASVKVSCKASGYTFTNYYMYWVRQAPGQGLEWMGGINPSNGGTNFNEKFKNRVTLTTDSSTTTAYMELKSLQFDDTAVYYCARRDYRFDMGFDYWGQTTVTVSS |
| 64 | CL20 light-chain variable region (AA) | EIVLTQSPATLSLSPGERATLSCRASKGVSTSGYSYLHWYQQKPGQAPRLLIYLASYLESGVPARFSGSGSGTDFTLTISSLEPEDFAVYYCQHSRDLPLTFGGGTKVEIK |
| 65 | CL20 light-chain CDR1 (AA) | RASKGVSTSGYSYLH |
| 66 | CL20 light-chain CDR2 (AA) | LASYLES |
| 67 | CL20 light-chain CDR3 (AA) | QHSRDLPLT |
| 68 | CL20 heavy-chain CDR1 (AA) | NYYMY |
| 69 | CL20 heavy-chain CDR2 (AA) | GINPSNGGTNFNEKFKN |
| 70 | CL20 heavy-chain CDR3 (AA) | RDYRFDMGFDY |
| 71 | CL1 heavy chain full length (AA) | QVQLVQSGVEVKKPGASVKVSCKASGYTFTNYYMYWVRQAPGQGLEWMGGINPSNGGTNFNEKFKNRVTLTTDSSTTTAYMELKSLQFDDTAVYYCAARDYRLDMGFEFWGQTTVTVSSASTKGPSVFPLAPCSRSTSESTAALGCLVKDYFPEPVTVSWNSGALTSGVHTFPAVLQSSGLYSLSSVVTVPSSSLGTKTYTCNVDHKPSNTKVDKRVESKYGPPCPPCPAPEFLGGPSVFLFPPKPKDTLMISRTPEVTCVVVDVSQEDPEVQFNWYVDGVEVHNAKTKPREEQFNSTYRVVSVLTVLHQDWLNGKEYKCKVSNKGLPSSIEKTISKAKGQPREPQVYTLPPSQEEMTKNQVSLTCLVKGFYPSDIAVEWESNGQPENN |

TABLE 1-continued

DNA or amino acid sequences of the anti-hPD-1 antibodies

| SEQ ID NO: | Description | Sequence |
|---|---|---|
|  |  | YKTTPPVLDSDGSFF LYSRLTVDKSRWQEG NVFSCSVMHEALHNH YTQKSLSLSLGK |
| 72 | CL1 light chain full length (AA) | EIVLTQSPATLSLSP GERATLSCRASKGVS TSGYSYLHWYQQKPG QAPRLLIYLASYLES GVPARFSGSGSGTDF TLTISSLEPEDFAVY YCQHAYDLPLTFGGG TKVEIKRTVAAPSVF IFPPSDEQLKSGTAS VVCLLNNFYPREAKV QWKVDNALQSGNSQE SVTEQDSKDSTYSLS STLTLSKADYEKHKV YACEVTHQGLSSPVT KSFNRGEC |
| 73 | CL1 heavy chain full length (DNA) | caggtgcagctggtg cagtccggcgtggag gtgaagaagcctggc gccagcgtgaaggtg tcctgtaaggccagc ggctacaccttcacc aattactatatgtat tgggtgcggcaggcc cccggccagggactg gagtggatgggaggc atcaatcccagcaac ggcggcaccaacttc aatgagaagtttaag aaccgggtgaccctg accaccgatagcagc accaccaccgcttac atggagctgaagagc ctgcagtttgacgat accgctgtgtactat tgcgctgcccgggat tacaggctggacatg ggcttcgagttctgg ggccagggcaccacc gtgaccgtgtccagc gctagcaccaagggc ccttccgtgttcccc ctggcccccctgtagc cggtccacctctgag agcaccgctgctctg ggctgtctggtgaag gattactttcccgaa ccggtgaccgtgtca tggaactccggggct ctgacatccggtgtc cacacttttcctgca gtgctgcagtcatcc ggcctgtacagcctg agctctgtggtcaca gtcccaagttcatcc ctgggaaccaagaca tatacttgcaacgtg gatcataaacccagc aatactaaggtcgac aaacgagtggagtct aagtacggaccacct tgcccaccatgtcca gcacctgagttcctg ggaggaccaagcgtg ttcctgtttcctcca aagcctaaagatacc ctgatgatcagtcgg actcccgaggtcacc tgcgtggtcgtggac |
| 74 | CL1 light chain full length (DNA) | gtgtcccaggaggac cctgaagtccagttc aactggtacgtggac ggcgtcgaagtgcac aatgctaagacaaaa cctcgagaggaacag tttaactccacatac cgtgtcgtgagcgtc ctgactgtgctgcat caggattggctgaac ggcaaggagtataag tgcaaagtgagcaat aagggactgccaagc tctatcgagaaaact atttctaaggctaaa ggacagcctaggaa ccacaggtgtacacc ctgccccctagtcag gaggaaatgactaag aaccaggtctcactg acctgtctggtgaaa gggttctatccttca gatattgcagtggag tgggaatccaatggt cagccagagaacaat tacaagacaactcca cccgtgctggacagc gatgggtcttctctt ctgtattctagactg accgtggacaaaagt cgctggcaggaggt aatgtcttttcttgt agtgtgatgcacgaa gccctgcacaaccac tacactcagaaaagc ctgtcactgtccctg ggtaaa gagatcgtgctgacc cagtccccgctacc ctgagcctgtcccc ggagagcgggctacc ctgtcttgtcgggcc tccaagggcgtgagc accagcggatactcc tatctgcactggtac cagcagaagcccggc caggctcccaggctg ctgatctacctggct tcctacctggagagc ggcgtgcccgctagg tttagcggcagcggc agcggaaccgatttc accctgaccatcagc tccctggagcccgag gattttgccgtgtac tactgccagcacgct tacgacctgcccctg acctttggcggcggc accaaggtggagatc aagcgtacggtggct gcaccatctgtcttc atcttcccgccatct gatgagcagttgaaa tctggaactgcctct gttgtgtgcctgctg aataacttctatccc agagaggccaaagta cagtggaaggtggat aacgccctccaatcg ggtaactcccaggag agtgtcacagagcag gacagcaaggacagc acctacagcctcagc |

TABLE 1-continued

DNA or amino acid sequences
of the anti-hPD-1 antibodies

| SEQ ID NO: | Description | Sequence |
|---|---|---|
| | | agcaccctgacgctg agcaaagcagactac gagaaacacaaagtc tacgcctgcgaagtc acccatcagggcctg agctcgcccgtcaca aagagcttcaacagg ggagagtgt |

Notes:
DNA within brackets in the table refers to nucleotides and AA refers to amino acids.

The nucleotide sequence encoding SEQ ID NO: 13 is shown in positions 73-114 of SEQ ID NO: 2;

The nucleotide sequence encoding SEQ ID NO: 14 is shown in positions 160-177 of SEQ ID NO: 2;

The nucleotide sequence encoding SEQ ID NO: 15 is shown in positions 271-303 of SEQ ID NO: 2;

The nucleotide sequence encoding SEQ ID NO: 16 is shown in positions 91-108 of SEQ ID NO: 1;

The nucleotide sequence encoding SEQ ID NO: 17 is shown in positions 148-192 of SEQ ID NO: 1;

The nucleotide sequence encoding SEQ ID NO: 18 is shown in positions 292-327 of SEQ ID NO: 1.

Example 2: Construction and Expression of Antibody CL1 and Related Antibodies

The DNA sequences of the VL and VH regions of antibody CL1 cloned by PCR were linked to the human κ light-chain constant region and the IgG4 constant region (γ4 heavy-chain constant region) respectively to construct the light-chain and heavy-chain DNA sequences. The 5' and 3' terminuses of the sequences were modified with PCR primers designed to add an appropriate leader sequence to each strand, and then the resulting sequences were cloned to the existing recombinant antibody expression vector. It was determined, by sequencing assay, that the vector was correctly constructed. 40 μg of expression plasmid was thoroughly mixed with 700 μL of CHO cell suspension that contained $10^7$ cells in total, and the mixture was added to a 0.4 cm electroporation cuvette and placed in an electroporation apparatus. The electroporation was completed under electroporation parameters set as: voltage 300 V, electric pulse duration 17 ms, and square wave. After the electroporation was completed, these cells were cultivated in 8 mL of growth medium for 3 days. The antibody concentration in the supernatant after transfection was measured by ELISA, and finally, the engineered cell line having high expression and good growth was determined.

Cells were cultivated in CD-CHO (Gibco) in shake flasks for 12 days. The antibody in the cell supernatant was purified by protein A affinity chromatography, washed, eluted with 1 M acetic acid, and neutralized with 3 M Tris. Finally, the buffer was replaced with 100 mM acetic acid which had been adjusted to pH 5.5 with 1 M Tris to obtain antibody CL1.

Antibodies CL5, CL9, CL2, CL7, CL6, and CL20 were constructed and expressed in a similar manner as described above.

The amino acid sequences of antibodies CL1, CL5, CL9, CL2, CL7, CL6 and CL20 obtained after purification were as expected.

Example 3: Assay for Affinity of the Anti-hPD-1 Antibodies to hPD-1

The binding of the antibodies to hPD-1 was determined by enzyme-linked immunosorbent assay (ELISA). hPD-1 was coated on a 96-well plate by incubation overnight at 4° C. After coating, the plate was washed 5 times with PBST. Dilutions of antibodies CL1, CL5, CL9, CL2, CL7, CL6, CL20, and hIgG at different concentrations were prepared with PBST, and incubated with coated hPD-1 for 1 hour at room temperature. After the binding, the plate was washed 5 times with PBST. The resulting solution was incubated at room temperature in PBST that contained peroxidase (HRP)-labeled goat anti-mouse IgG solution diluted to 1/10000 for 1 hour, washed again, and developed with TMB.

ELISA results are shown in FIG. 1. With a half maximal effective concentration ($EC_{50}$) representing the binding affinity, results are shown in Table 2.

The experimental results indicate that anti-hPD-1 antibodies CL1, CL5, CL9, CL2, CL7, CL6, and CL20 all bind to hPD-1, and CL1 demonstrates a strongest affinity, with an $EC_{50}$ of about 0.208 nM for the binding to hPD-1, and is significantly superior to CL5, CL9, CL2, CL7, CL6, and CL20.

Example 4: Kinetics Analysis for the Binding of Antibody CL1 to hPD-1

To further characterize the binding properties of the antibody, antibody CL1 was profiled by bio-layer interferometry on the Octet system (ForteBio, Menlo Park, California) to illustrate the binding kinetics and calculate the equilibrium binding constant. The assay was performed by coupling a hPD-1 fusion protein to a streptavidin biosensor using biotin.

hPD-1 needs to be biotinylated to facilitate the fixing of hPD-1 on a streptavidin biosensor matrix. 1.0 mg of biotin was first dissolved in 100 μl of dimethyl sulfoxide to obtain a biotin solution at 10 mg/ml, then each milliliter of hPD-1 (1.8 mg/ml) solution was added with 10 μl of the biotin solution, and the reaction solution was gently stirred and incubated in the dark at room temperature for 2 hours to obtain biotinylated hPD-1. A PD-10 column packed with Sephadex G-25M (Pharmacia, Catalog No.: 17-0851-01) was equilibrated with 25 ml of cold PBS, and 2 ml of biotinylated hPD-1 was loaded per column. The column was eluted with 10×1 ml cold PBS. The eluent was collected and read at OD280 to obtain purified biotinylated hPD-1, and the obtained biotinylated hPD-1 was stored at −80° C. until use.

A streptavidin biosensor was pre-wetted by immersing in PBS in a well for 10 minutes, and then the biosensor was equilibrated with PBS for 2 minutes. The biosensor was immersed in the solution of 20 μg/mL biotinylated hPD-1 in PBS for 5 minutes to couple with biotinylated hPD-1, and then was equilibrated with PBS for 2 minutes. The biosensors were placed in wells containing antibody solutions of various concentrations (0.125 to 2 nM, SDS-PAGE purity >99%) to observe their binding to the anti-PD-1 antibody, and the binding was monitored and measured for 30 minutes. After the biosensor was transferred to PBS, dissociation was monitored and measured for 90 minutes. The observed binding and dissociation rates ($k_{binding}$ and $k_{dissociation}$) were fitted with a 1:1 binding global fit model containing all test concentrations, and the equilibrium binding constant KD was calculated.

Figure 2:
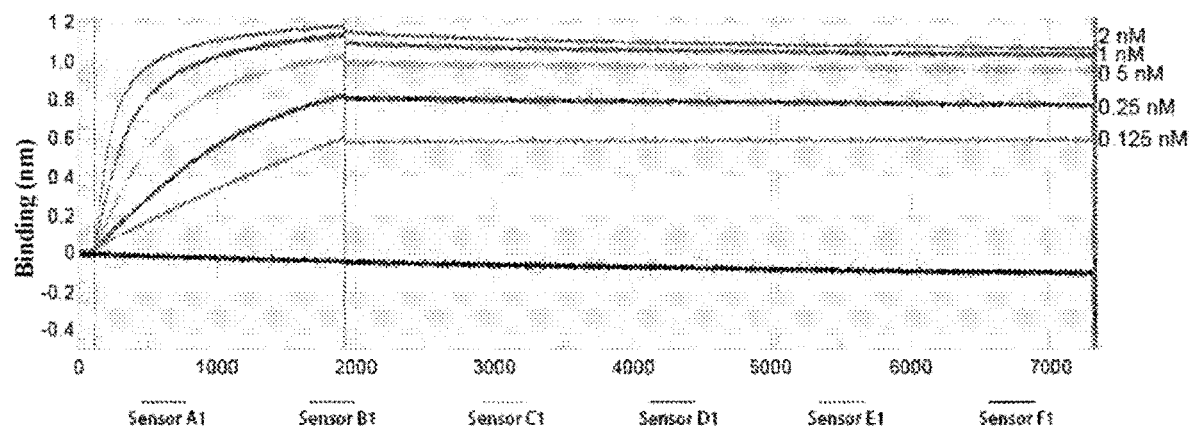
FIG. 2 illustrates $k_{on}$ and $k_{off}$ of antibody CLI determined by a biolayer interferometry. Among them, each curve represents the dynamic process of antibody CL1 binding to the hPD-1 at different concentrations.

The results of kinetics assays are shown in Table 2 and FIG. 2.

The experimental results show that KD of the binding of antibody CL1 to hPD-1 is about 0.0207 nM. Such a strong affinity is resulting from a much higher binding rate and a slower dissociation rate than ordinary antibodies.

Example 5: Assay for the Blocking of
hPD-1/hPD-L1 Binding by Antibody CL1

Figure 3:
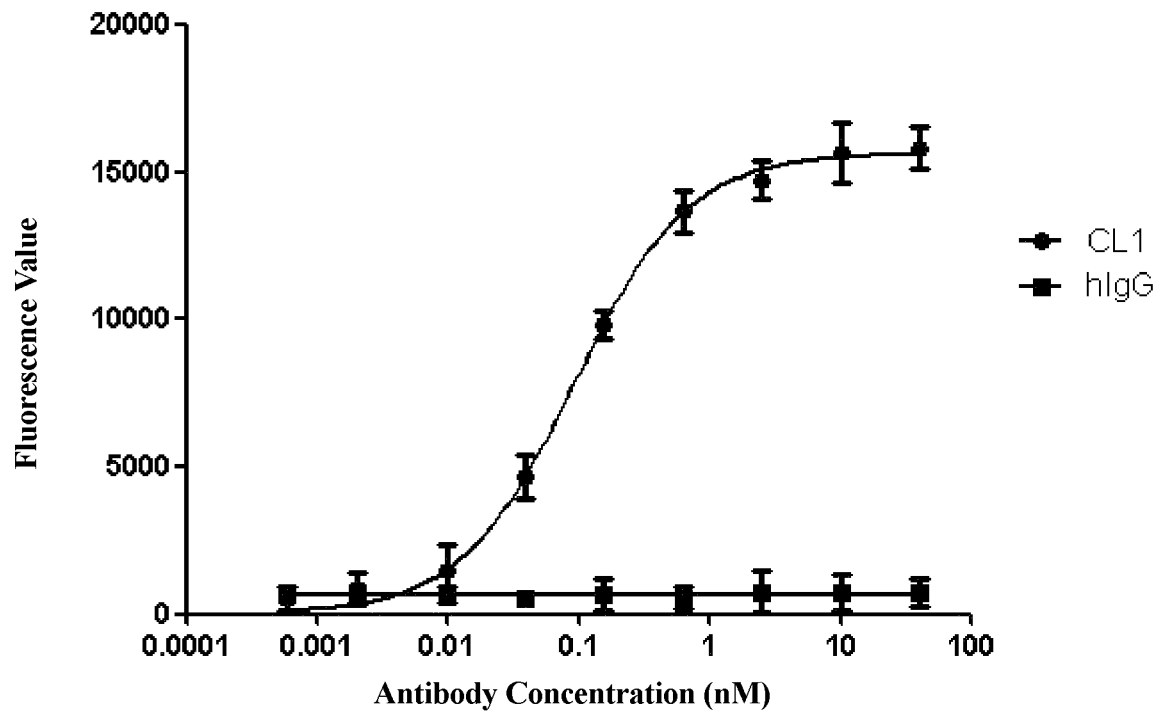
FIG. 3 shows a flow cytometry detecting the blockade of the hPD-1/hPD-L1 binding by antibody CL1.

The blocking of ligand binding was assayed by flow cytometry. Jurkat cells expressing hPD-1 were plated in a 96-well plate, and then antibody solutions (CL1 or hIgG (as a negative control)) of various concentrations and unlabeled hPD-L1 at a concentration of 1 μg/mL were added. The mixture was placed on ice for 30 minutes, washed 3 times with FACS buffer (PBS containing 0.3% BSA), and incubated with PE-labeled goat anti-human Fc on ice for another 30 minutes. Cells were washed three more times with FACS buffer and analyzed by flow cytometry. Data were analyzed using nonlinear regression of Prism software, and $IC_{50}$ values were calculated. The results are shown in Table 2 and FIG. 3.

The experimental results show that the anti-PD-1 antibody CL1 can completely inhibit the binding of hPD-L1 to hPD-1 of Jurkat cells in a dose-dependent manner, with an $IC_{50}$ value of about 0.77 nM.

TABLE 2

Affinity, kinetics, ligand binding blocking, and functional activity of the anti-hPD-1 antibody

|  | CL1 | CL5 | CL9 | CL2 | CL7 | CL6 | CL20 |
|---|---|---|---|---|---|---|---|
| ELISA affinity assay $EC_{50}$ (nM) | 0.208 | 0.399 | 0.594 | 0.451 | 0.346 | 1.336 | 0.242 |
| ForteBio kinetics analysis $k_{binding}$ (1/Ms) $k_{dissociation}$ (1/s) KD (nM) | $1.98 \times 10^6$ $4.11 \times 10^{-5}$ 0.0207 | NA | NA | NA | NA | NA | NA |
| Assay for the blocking of ligand binding $IC_{50}$ (nM) | 0.77 | NA | NA | NA | NA | NA | NA |
| Assay for the functional activity $EC_{50}$ (μg/mL) | 0.269 | 0.932 | NA | NA | NA | NA | NA |

NA: No relevant experiments have been conducted and data are available.

Example 6: Kinetics Analysis for Antibodies Related to Antibody CL1

A series of antibodies related to antibody CL1 were analyzed by bio-layer interferometry as described in Example 4. The amino acid sequences of VL and VH regions of the related antibodies are shown in the sequence listing. The equilibrium binding constant KD of each relevant antibody is shown in Table 3.

TABLE 3

The binding of CL1 antibody-related antibodies to hPD-1

| VH | VL | Form | KD (nM) |
|---|---|---|---|
| CL1 VH (SEQ ID NO: 7) | CL1 VL (SEQ ID NO: 8) | IgG4 | 0.0207 |
| CL1 VH (SEQ ID NO: 7) | CL1 VL (SEQ ID NO: 8) | scFv | 0.082 |
| CL1 VH (SEQ ID NO: 7) | CL5 VL (SEQ ID NO: 10) | IgG4 | 0.076 |
| CL1 VH (SEQ ID NO: 7) | CL5 VL (SEQ ID NO: 10) | scFv | 0.143 |
| CL1 VH (SEQ ID NO: 7) | CL9 VL (SEQ ID NO: 12) | IgG4 | 0.229 |
| CL1 VH (SEQ ID NO: 7) | CL9 VL (SEQ ID NO: 12) | scFv | 0.518 |
| CL1 VH (SEQ ID NO: 7) | CL2 VL (SEQ ID NO: 38) | IgG4 | 0.189 |
| CL1 VH (SEQ ID NO: 7) | CL2 VL (SEQ ID NO: 38) | scFv | 0.447 |
| CL1 VH (SEQ ID NO: 7) | CL7 VL (SEQ ID NO: 40) | IgG4 | 0.061 |

TABLE 3-continued

The binding of CL1 antibody-related antibodies to hPD-1

| VH | VL | Form | KD (nM) |
|---|---|---|---|
| CL1 VH (SEQ ID NO: 7) | CL7 VL (SEQ ID NO: 40) | scFv | 0.149 |

The results in Table 3 demonstrate that, with the same VH and VL, the affinity of an antibody in the form of scFv to hPD-1 is lower than that of an antibody in the form of IgG4. With the same form, namely, all in the form of IgG4 or scFv, antibodies, obtained by maintaining the VH amino acid sequence of antibody CL1 unchanged and replacing the VL of antibody CL1 with the VL of antibody CL5, the VL of antibody CL9, the VL of antibody CL2, or the VL of antibody CL7, had a decreased affinity, and the one obtained by replacing the VL of antibody CL1 with the VL of antibody CL9 had the lowest affinity. It is shown that the VL of antibody CL1 plays an important role in the binding of CL1 to hPD-1, and the change of an amino acid sequence may lead to a change in conformation and thus the binding to hPD-1 is affected.

Example 7: Assay for the Functional Activity of the Anti-hPD-1 Antibody

The ability of an anti-hPD-1 antibody to inhibit the hPD-1 activity was detected in vitro to determine the functional activity of the anti-hPD-1 antibody.

The anti-hPD-1 antibody blocked the interaction between hPD-1 and hPD-L1 and activated the TCR downstream immune signaling pathways in Jurkat cells.

A reporter gene is a gene whose expression product is easily identified. The coding sequence of the reporter gene was fused with the regulatory sequence of the target gene to form a chimeric gene, and expressed under the control of the regulatory sequence, and then upstream signaling was indirectly detected by detecting the expression product of the reporter gene. The PD-1/PD-L1 Blockade Bioassay system is suitable for the biological activity assay of the anti-PD-1 monoclonal antibody. The primary principle thereof is as follows: a CHO-K1 cell line stably expressing PD-L1 and T-cell receptor activator (TCR activator) on the cell membrane is constructed, mimicking antigen presenting cells (APCs); and Jurkat cell line, a human T lymphocyte line expressing PD-1 on the cell membrane, is transfected with a Luciferase reporter vector having NFAT as a promoter. When the two cell lines are co-incubated, the TCR activator of a CHO-K1 cell binds to TCR on the surface of a Jurkat cell to induce the downstream signaling pathway and eventually activate the expression of a reporter gene, but at the same time the PD-1/PD-L1 interaction will block this activation. After the anti-PD-1 monoclonal antibody is added, the PD-1/PD-L1 interaction is blocked, and the luciferase reporter gene restarts to express. A fluorescence signal is generated, and the signal value is positively correlated to the amount of the anti-PD-1 monoclonal antibody added.

The anti-hPD-1 antibody was assayed and evaluated by co-incubating the antibody with the cells as described below. CHO-K1 cells were resuspended in F-12+10% FBS medium (containing 200 μg/ml Hygromycin B and 250 μg/ml G418), with a cell density being adjusted to $4.0 \times 10^5$ cells/ml, and were inoculated to a 96-well plate at 100 μl/well. The 96-well plate was placed in an incubator of 37° C. and 5% $CO_2$, and incubated overnight. 125 μl of the antibody solution (CL1, CL5, and hIgG) in the 96-well microplate was serially 2.5-fold diluted in triplicate along the plate with an assay diluent (RPMI medium containing 1% fetal bovine serum (FBS)). Jurkat cells were resuspended with the assay diluent, and the cell density was adjusted to $1.25 \times 10^6$ cells/ml. The 96-well plate was taken out, and the medium was removed. 40 μl of the prepared reference substance (hIgG) and the test samples (CL1 and CL5) were added to the 96-well plate, and then 40 μl of Jurkat cell suspension was added to the 96-well plate. The 96-well plate was placed in an incubator of 37° C. and 5% $CO_2$ for 6 hours, and then placed at room temperature for 10 minutes. Then 80 μl of Bio-Glo Luciferase Assay System reagent was added to each well, and the plate was placed in the dark at room temperature for 30 minutes. The fluorescence value for each well of the 96-well plate was read by the autofluorescence detection function of a multifunctional microplate reader. Curve fitting was performed on the data of reference and test samples with a 4-parameter model by using SoftMax Pro 6.5.1 software, and the $EC_{50}$ was determined by a standard method. The results are shown in Table 2 and FIG. 4.

Figure 4:
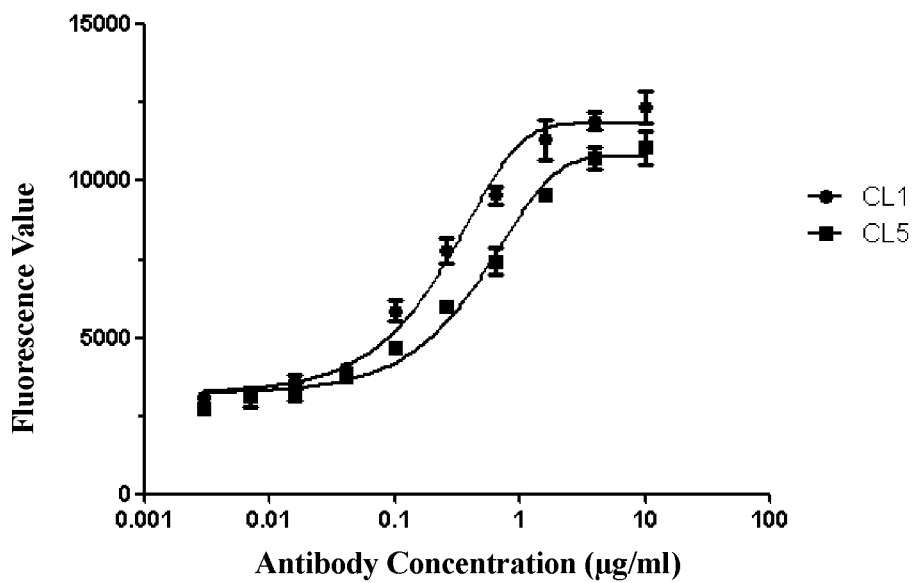
FIG. 4 shows the functional activity of the anti-hPD-1 antibody measured by PD-1/PD-L1 Blockade Bioassay.

The results in Table 2 and FIG. 4 show that in the presence of the anti-hPD-1 antibody, the PD-1/PD-L1 interaction is blocked, the inhibited TCR downstream signaling pathways of Jurkat cells are reactivated, the Luciferase reporter gene expression resumes, and a fluorescence signal is generated. The anti-hPD-1 antibody blocks the PD-1/PD-L1 interaction in a dose-dependent manner. Further, $EC_{50}$, representing the ability to inhibit the hPD-1 activity, is about 0.269 μg/ml and 0.932 μg/ml respectively for antibodies CL1 and CL5, indicating that CL1 has a stronger ability to inhibit the hPD-1 activity. It has been proved once again at a cellular level that the antibody CL1 is superior to CL5 in terms of the functional activity, which is also consistent with the results of Example 3.

Example 8: Comparison of Kinetics Analyses for the Binding of Antibodies CL1 and CL20 to hPD-1

Kinetics of the binding of antibodies CL1 and CL20 to hPD-1 was analyzed and compared on the Biacore system (GE, Boston, MA) using the surface plasmon resonance technology.

A protein A chip was used for detection. An antibody CL1 or CL20 solution with a concentration of 5 μg/ml passed through the experimental flow path at a flow rate of 10 μl/min, and the capture amount was about 200 RU for 10 s. Then the flow rate was adjusted to 30 μl/min, and PD-1 solutions of different concentrations (0.625 nM, 1.25 nM, 2.5 nM, 5 nM, and 10 nM) were fed in sequence, with a binding time of 180 s and a dissociation time of 1,200 s. The binding and dissociation curves were obtained by fitting with a 1:1 Langmuir binding model, and the kinetic parameters of the binding of antibodies CL1 and CL20 to hPD-1 were obtained ($k_{binding}$: binding rate; $k_{dissociation}$: dissociation rate; KD: equilibrium dissociation constant). The results of kinetics assays are shown in Table 4. KD of the binding of antibody CL1 to hPD-1 is about 0.606 nM, KD of the binding of antibody CL20 to hPD-1 is about 4.434 nM, and the affinity of antibody CL1 to hPD-1 is about 8 times that of antibody CL20 to hPD-1.

TABLE 4

Kinetics data of the binding of antibodies CL1 and CL20 to hPD-1

|  | CL1 | CL20 |
|---|---|---|
| k binding (1/Ms) | $8.252 \times 10^5$ | $1.025 \times 10^6$ |
| k dissociation (1/s) | $4.999 \times 10^{-4}$ | $4.544 \times 10^{-3}$ |
| KD (nM) | 0.606 | 4.434 |

The invention claimed is:

1. An antibody or antigen-binding fragment thereof having binding specificity to PD-1, comprising a light-chain variable region (VL) comprising a VL CDR1, a VL CDR2 and a VL CDR3, and a heavy-chain variable region (VH) comprising a VH CDR1, a VH CDR2 and a VH CDR3, wherein the VL CDR1, VL CDR2, VL CDR3, VH CDR1, VH CDR2 and VH CDR3 comprise, respectively, the amino acid sequences of SEQ ID NO:13-18.

2. The antibody or antigen-binding fragment thereof according to claim 1, wherein
the VH comprises the amino acid sequence of SEQ ID NO: 7; and
the VL comprises the amino acid sequence of SEQ ID NO: 8.

3. The antibody or antigen-binding fragment thereof according to claim 1, which further comprises a human γ4 heavy-chain constant region, and/or a human κ light-chain constant region.

4. A biological material characterized in that the biological material is:
B1) a nucleic acid molecule encoding the antibody or antigen-binding fragment thereof of claim 1; or
B2) an expression cassette, a recombinant vector, a recombinant cell, or a recombinant microorganism comprising the nucleic acid molecule of B1).

5. The biological material according to claim 4, characterized in that the nucleic acid molecule of B1) comprises:
a nucleic acid fragment set forth in positions 91-108 of SEQ ID NO: 1;
a nucleic acid fragment set forth in positions 148-192 of SEQ ID NO: 1;

a nucleic acid fragment set forth in positions 292-327 of SEQ ID NO: 1;

a nucleic acid fragment set forth in positions 73-114 of SEQ ID NO: 2;

a nucleic acid fragment set forth in positions 160-177 of SEQ ID NO: 2; and a nucleic acid fragment set forth in positions 271-303 of SEQ ID NO: 2.

6. A method for preparing the antibody or antigen-binding fragment thereof according to claim 1, the method comprising:

expressing a nucleic acid molecule encoding the antibody or antigen-binding fragment thereof in a recombinant cell.

7. A pharmaceutical composition comprising the antibody or antigen-binding fragment thereof according to claim 1, and a pharmaceutically acceptable excipient, diluent, or carrier, or a combination thereof.

8. A method for detecting PD-1 comprising contacting a sample with the antigen-binding fragment thereof according to claim 1.

9. An antibody comprising a heavy chain and a light chain, characterized in that the heavy chain comprises the amino acid sequence of SEQ ID NO: 71, and the light chain comprises the amino acid sequence of SEQ ID NO: 72.

10. A method of treating a cancer comprising administering an effective amount of the antibody or antigen-binding fragment thereof according to claim 1.

11. The method of claim 10, wherein the cancer is selected from the group consisting of melanoma, renal carcinoma, prostate cancer, pancreatic cancer, breast cancer, colon cancer, lung cancer, esophageal cancer, head and neck squamous cell carcinoma, liver cancer, ovarian cancer, cervical cancer, thyroid cancer, glioblastoma, glioma, leukemia, and lymphoma.

12. The method of claim 10, wherein the cancer is metastatic malignant melanoma, non-small cell lung cancer, clear cell carcinoma or prostate cancer.

* * * * *

SEQUENCE LISTING

<160> NUMBER OF SEQ ID NOS: 74

<210> SEQ ID NO 1
<211> LENGTH: 360
<212> TYPE: DNA
<213> ORGANISM: Artificial Sequence
<220> FEATURE:
<223> OTHER INFORMATION: CL1 Heavy-Chain Variable Region

<400> SEQUENCE: 1

```
caggtgcagc tggtgcagtc cggcgtggag gtgaagaagc ctggcgccag cgtgaaggtg      60
tcctgtaagg ccagcggcta caccttcacc aattactata tgtattgggt gcggcaggcc     120
cccggccagg gactggagtg gatgggaggc atcaatccca gcaacggcgg caccaacttc     180
aatgagaagt ttaagaaccg ggtgaccctg accaccgata gcagcaccac caccgcttac     240
atggagctga gagcctgca gtttgacgat accgctgtgt actattgcgc tgcccgggat      300
tacaggctgg acatgggctt cgagttctgg ggccagggca ccaccgtgac cgtgtccagc     360
```

<210> SEQ ID NO 2
<211> LENGTH: 333
<212> TYPE: DNA
<213> ORGANISM: Artificial Sequence
<220> FEATURE:
<223> OTHER INFORMATION: CL1 Light-Chain Variable Region

<400> SEQUENCE: 2

```
gagatcgtgc tgacccagtc ccccgctacc ctgagcctgt cccccggaga gcgggctacc      60
ctgtcttgtc gggcctccaa gggcgtgagc accagcggat actcctatct gcactggtac     120
cagcagaagc ccggccaggc tcccaggctg ctgatctacc tggcttccta cctggagagc     180
ggcgtgcccg ctaggtttag cggcagcggc agcggaaccg atttcaccct gaccatcagc     240
tccctggagc ccgaggattt tgccgtgtac tactgccagc acgcttacga cctgcccctg     300
acctttggcg gcgcaccaa ggtggagatc aag                                    333
```

<210> SEQ ID NO 3
<211> LENGTH: 360
<212> TYPE: DNA
<213> ORGANISM: Artificial Sequence
<220> FEATURE:
<223> OTHER INFORMATION: CL5 Heavy-Chain Variable Region

<400> SEQUENCE: 3

```
caagttcaat tagtccaaag tggtgtcgaa gtaaagaagc aggtgcctc agtcaaagtc      60 agttgtaaag cctcaggtta tacatttaca aactactaca tgtactgggt tagacaagcc     120
ccaggtcaag gtttggaatg gatgggtggt atcaatcctt caaacggtgg caccaacttc     180
aacgaaaagt tcaagaacag agtaactttg actacagatt cttcaaccac tacagcatac     240
atggaattga atctttaca attcgatgac acagctgttt actactgtgc agcgcgtgat     300
tacagattcg acatgggttt cgaatactgg ggtcaaggta ccactgttac tgtctcctct     360
```

<210> SEQ ID NO 4
<211> LENGTH: 333
<212> TYPE: DNA
<213> ORGANISM: Artificial Sequence
<220> FEATURE:
<223> OTHER INFORMATION: CL5 Light-Chain Variable Region

<400> SEQUENCE: 4

```
gaaattgtct tgactcaatc tccagctaca ttgtccttaa gtcctggtga aagagccaca      60
ttgtcatgca gagcttccaa aggtgtatct acctcaggtt actcttactt gcattggtat     120
caacaaaagc caggtcaagc acctagattg ttgatctact tggccagtta cttggaatct     180
ggtgttccag ctagattttc cggtagtggt tctggtactg acttcacatt gaccatatct     240
tcattagaac ctgaagattt cgcagtctat tactgccaac attcttatga ccttccactt     300
acattcggag gtggtacaaa ggtagaaata aaa                                   333
```

<210> SEQ ID NO 5
<211> LENGTH: 360
<212> TYPE: DNA
<213> ORGANISM: Artificial Sequence
<220> FEATURE:
<223> OTHER INFORMATION: CL9 Heavy-Chain Variable Region

<400> SEQUENCE: 5

```
caagttcaat tagtccaaag tggtgtcgaa gtaaagaagc caggtgcctc agtcaaagtc      60
agttgtaaag cctcaggtta tacatttaca aactactaca tgtactgggt tagacaagcc     120
ccaggtcaag gtttggaatg gatgggtggt atcaatcctt caaacggtgg caccaacttc     180
aacgaaaagt tcaagaacag agtaactttg actacagatt cttcaaccac tacagcatac     240
atggaattga atctttaca attcgatgac acagctgttt actactgtgc agcacgtgat     300
tacaaattcg acatgggttt cgaattctgg ggtcaaggta ccactgttac tgtctcctct     360
```

<210> SEQ ID NO 6
<211> LENGTH: 333
<212> TYPE: DNA
<213> ORGANISM: Artificial Sequence
<220> FEATURE:
<223> OTHER INFORMATION: CL9 Light-Chain Variable Region

<400> SEQUENCE: 6

```
gaaattgtct tgactcaatc tccagctaca ttgtccttaa gtcctggtga aagagccaca      60
ttgtcatgca gagcttccaa aggtgtatct acctcaggtt actcttactt gcattggtat     120
caacaaaagc caggtcaagc acctagattg ttgatctact tggccagtta cttggaatct     180
ggtgttccag ctagattttc cggtagtggt tctggtactg acttcacatt gaccatatct     240
tcattagaac ctgaagattt cgcagtctat tattgccaac attcctatgg ccttccagtt     300
acattcggtg gtggtacaaa ggtagaaata aaa                                   333
```

<210> SEQ ID NO 7
<211> LENGTH: 120
<212> TYPE: PRT
<213> ORGANISM: Artificial Sequence
<220> FEATURE:
<223> OTHER INFORMATION: CL1 Heavy-Chain Variable Region

<400> SEQUENCE: 7

Gln Val Gln Leu Val Gln Ser Gly Val Glu Val Lys Lys Pro Gly Ala
1               5                   10                  15

```
Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Ala Arg Asp Tyr Arg Leu Asp Met Gly Phe Glu Phe Trp Gly Gln
            100                 105                 110

Gly Thr Thr Val Thr Val Ser Ser
            115                 120

<210> SEQ ID NO 8
<211> LENGTH: 111
<212> TYPE: PRT
<213> ORGANISM: Artificial Sequence
<220> FEATURE:
<223> OTHER INFORMATION: CL1 Light-Chain Variable Region

<400> SEQUENCE: 8

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ala Tyr
                85                  90                  95

Asp Leu Pro Leu Thr Phe Gly Gly Gly Thr Lys Val Glu Ile Lys
            100                 105                 110

<210> SEQ ID NO 9
<211> LENGTH: 120
<212> TYPE: PRT
<213> ORGANISM: Artificial Sequence
<220> FEATURE:
<223> OTHER INFORMATION: CL5 Heavy-Chain Variable Region

<400> SEQUENCE: 9

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95
```

```
Ala Ala Arg Asp Tyr Arg Phe Asp Met Gly Phe Glu Tyr Trp Gly Gln
            100                 105                 110

Gly Thr Thr Val Thr Val Ser Ser
        115                 120

<210> SEQ ID NO 10
<211> LENGTH: 111
<212> TYPE: PRT
<213> ORGANISM: Artificial Sequence
<220> FEATURE:
<223> OTHER INFORMATION: CL5 Light-Chain Variable Region

<400> SEQUENCE: 10

Glu Ile Val Leu Thr Gln Ser Pro Ala Thr Leu Ser Leu Ser Pro Gly
1               5                  10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Tyr
                85                  90                  95

Asp Leu Pro Leu Thr Phe Gly Gly Gly Thr Lys Val Glu Ile Lys
            100                 105                 110

<210> SEQ ID NO 11
<211> LENGTH: 120
<212> TYPE: PRT
<213> ORGANISM: Artificial Sequence
<220> FEATURE:
<223> OTHER INFORMATION: CL9 Heavy-Chain Variable Region

<400> SEQUENCE: 11

Gln Val Gln Leu Val Gln Ser Gly Val Glu Val Lys Lys Pro Gly Ala
1               5                  10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Ala Arg Asp Tyr Lys Phe Asp Met Gly Phe Glu Phe Trp Gly Gln
            100                 105                 110

Gly Thr Thr Val Thr Val Ser Ser
        115                 120

<210> SEQ ID NO 12
<211> LENGTH: 111
<212> TYPE: PRT
<213> ORGANISM: Artificial Sequence
<220> FEATURE:
<223> OTHER INFORMATION: CL9 Light-Chain Variable Region
```

<400> SEQUENCE: 12

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Tyr
                85                  90                  95

Gly Leu Pro Val Thr Phe Gly Gly Gly Thr Lys Val Glu Ile Lys
            100                 105                 110

<210> SEQ ID NO 13
<211> LENGTH: 14
<212> TYPE: PRT
<213> ORGANISM: Artificial Sequence
<220> FEATURE:
<223> OTHER INFORMATION: CL1 Light-Chain CDR1

<400> SEQUENCE: 13

Ala Ser Lys Gly Val Ser Thr Ser Gly Tyr Ser Tyr Leu His
1               5                   10

<210> SEQ ID NO 14
<211> LENGTH: 6
<212> TYPE: PRT
<213> ORGANISM: Artificial Sequence
<220> FEATURE:
<223> OTHER INFORMATION: CL1 Light-Chain CDR2

<400> SEQUENCE: 14

Leu Ala Ser Tyr Leu Glu
1               5

<210> SEQ ID NO 15
<211> LENGTH: 11
<212> TYPE: PRT
<213> ORGANISM: Artificial Sequence
<220> FEATURE:
<223> OTHER INFORMATION: CL1 Light-Chain CDR3

<400> SEQUENCE: 15

Tyr Cys Gln His Ala Tyr Asp Leu Pro Leu Thr
1               5                   10

<210> SEQ ID NO 16
<211> LENGTH: 6
<212> TYPE: PRT
<213> ORGANISM: Artificial Sequence
<220> FEATURE:
<223> OTHER INFORMATION: CL1 Heavy-Chain CDR1

<400> SEQUENCE: 16

Asn Tyr Tyr Met Tyr Trp
1               5

<210> SEQ ID NO 17
<211> LENGTH: 15

```
<212> TYPE: PRT
<213> ORGANISM: Artificial Sequence
<220> FEATURE:
<223> OTHER INFORMATION: CL1 Heavy-Chain CDR2

<400> SEQUENCE: 17

Gly Ile Asn Pro Ser Asn Gly Gly Thr Asn Phe Asn Glu Lys Phe
1               5                   10                  15

<210> SEQ ID NO 18
<211> LENGTH: 12
<212> TYPE: PRT
<213> ORGANISM: Artificial Sequence
<220> FEATURE:
<223> OTHER INFORMATION: CL1 Heavy-Chain CDR3

<400> SEQUENCE: 18

Ala Arg Asp Tyr Arg Leu Asp Met Gly Phe Glu Phe
1               5                   10

<210> SEQ ID NO 19
<211> LENGTH: 14
<212> TYPE: PRT
<213> ORGANISM: Artificial Sequence
<220> FEATURE:
<223> OTHER INFORMATION: CL5 Light-Chain CDR1

<400> SEQUENCE: 19

Ala Ser Lys Gly Val Ser Thr Ser Gly Tyr Ser Tyr Leu His
1               5                   10

<210> SEQ ID NO 20
<211> LENGTH: 6
<212> TYPE: PRT
<213> ORGANISM: Artificial Sequence
<220> FEATURE:
<223> OTHER INFORMATION: CL5 Light-Chain CDR2

<400> SEQUENCE: 20

Leu Ala Ser Tyr Leu Glu
1               5

<210> SEQ ID NO 21
<211> LENGTH: 11
<212> TYPE: PRT
<213> ORGANISM: Artificial Sequence
<220> FEATURE:
<223> OTHER INFORMATION: CL5 Light-Chain CDR3

<400> SEQUENCE: 21

Tyr Cys Gln His Ser Tyr Asp Leu Pro Leu Thr
1               5                   10

<210> SEQ ID NO 22
<211> LENGTH: 6
<212> TYPE: PRT
<213> ORGANISM: Artificial Sequence
<220> FEATURE:
<223> OTHER INFORMATION: CL5 Heavy-Chain CDR1

<400> SEQUENCE: 22

Asn Tyr Tyr Met Tyr Trp
1               5

<210> SEQ ID NO 23
<211> LENGTH: 15
<212> TYPE: PRT
```

```
<213> ORGANISM: Artificial Sequence
<220> FEATURE:
<223> OTHER INFORMATION: CL5 Heavy-Chain CDR2

<400> SEQUENCE: 23

Gly Ile Asn Pro Ser Asn Gly Gly Thr Asn Phe Asn Glu Lys Phe
1               5                   10                  15

<210> SEQ ID NO 24
<211> LENGTH: 12
<212> TYPE: PRT
<213> ORGANISM: Artificial Sequence
<220> FEATURE:
<223> OTHER INFORMATION: CL5 Heavy-Chain CDR3

<400> SEQUENCE: 24

Ala Arg Asp Tyr Arg Phe Asp Met Gly Phe Glu Tyr
1               5                   10

<210> SEQ ID NO 25
<211> LENGTH: 14
<212> TYPE: PRT
<213> ORGANISM: Artificial Sequence
<220> FEATURE:
<223> OTHER INFORMATION: CL9 Light-Chain CDR1

<400> SEQUENCE: 25

Ala Ser Lys Gly Val Ser Thr Ser Gly Tyr Ser Tyr Leu His
1               5                   10

<210> SEQ ID NO 26
<211> LENGTH: 6
<212> TYPE: PRT
<213> ORGANISM: Artificial Sequence
<220> FEATURE:
<223> OTHER INFORMATION: CL9 Light-Chain CDR2

<400> SEQUENCE: 26

Leu Ala Ser Tyr Leu Glu
1               5

<210> SEQ ID NO 27
<211> LENGTH: 11
<212> TYPE: PRT
<213> ORGANISM: Artificial Sequence
<220> FEATURE:
<223> OTHER INFORMATION: CL9 Light-Chain CDR3

<400> SEQUENCE: 27

Tyr Cys Gln His Ser Tyr Gly Leu Pro Val Thr
1               5                   10

<210> SEQ ID NO 28
<211> LENGTH: 6
<212> TYPE: PRT
<213> ORGANISM: Artificial Sequence
<220> FEATURE:
<223> OTHER INFORMATION: CL9 Heavy-Chain CDR1

<400> SEQUENCE: 28

Asn Tyr Tyr Met Tyr Trp
1               5

<210> SEQ ID NO 29
<211> LENGTH: 15
<212> TYPE: PRT
<213> ORGANISM: Artificial Sequence
```

<220> FEATURE:
<223> OTHER INFORMATION: CL9 Heavy-Chain CDR2

<400> SEQUENCE: 29

Gly Ile Asn Pro Ser Asn Gly Gly Thr Asn Phe Asn Glu Lys Phe
1               5                   10                  15

<210> SEQ ID NO 30
<211> LENGTH: 12
<212> TYPE: PRT
<213> ORGANISM: Artificial Sequence
<220> FEATURE:
<223> OTHER INFORMATION: CL9 Heavy-Chain CDR3

<400> SEQUENCE: 30

Ala Arg Asp Tyr Lys Phe Asp Met Gly Phe Glu Phe
1               5                   10

<210> SEQ ID NO 31
<211> LENGTH: 360
<212> TYPE: DNA
<213> ORGANISM: Artificial Sequence
<220> FEATURE:
<223> OTHER INFORMATION: CL2 Heavy-Chain Variable Region

<400> SEQUENCE: 31
caagttcaat tagtccaaag tggtgtcgaa gtaaagaagc caggtgcctc agtcaaagtc      60
agttgtaaag cctcaggtta tacatttaca aactactaca tgtactgggt tagacaagcc     120
ccaggtcaag gtttggaatg gatgggtggt atcaatcctt caaacggtgg caccaacttc     180
aacgaaaagt tcaagaacag agtaactttg actacagatt cttcaaccac tacagcatac     240
atggaattga atctttaca attcgatgac acagctgttt actactgtgc agcccgtgat      300
tacaaattcg acatgggttt cgagtactgg ggtcaaggta ccactgttac tgtctcctct     360

<210> SEQ ID NO 32
<211> LENGTH: 333
<212> TYPE: DNA
<213> ORGANISM: Artificial Sequence
<220> FEATURE:
<223> OTHER INFORMATION: CL2 Light-Chain Variable Region

<400> SEQUENCE: 32
gaaattgtct tgactcaatc tccagctaca ttgtccttaa gtcctggtga aagagccaca      60
ttgtcatgca gagcttccaa aggtgtatct acctcaggtt actcttactt gcattggtat     120
caacaaaagc caggtcaagc acctagattg ttgatctact ggccagttca cttggaatct     180
ggtgttccag ctagatttc cggtagtggt tctggtactg acttcacatt gaccatatct     240
tcattagaac tgaagatt cgcagtctat tattgccaac attcctatgg tcttccactt     300
acattcggtg gtggtacaaa ggtagaaata aaa                                  333

<210> SEQ ID NO 33
<211> LENGTH: 360
<212> TYPE: DNA
<213> ORGANISM: Artificial Sequence
<220> FEATURE:
<223> OTHER INFORMATION: CL7 Heavy-Chain Variable Region

<400> SEQUENCE: 33
caagttcaat tagtccaaag tggtgtcgaa gtaaagaagc caggtgcctc agtcaaagtc      60
agttgtaaag cctcaggtta tacatttaca aactactaca tgtactgggt tagacaagcc     120

```
ccaggtcaag gtttggaatg gatgggtggt atcaatcctt caaacggtgg caccaacttc    180
aacgaaaagt tcaagaacag agtaactttg actacagatt cttcaaccac tacagcatac    240
atggaattga atctttaca attcgatgac acagctgttt actactgtgc agcccgtgat    300
taccgattcg acatgggttt cgagttttgg ggtcaaggta ccactgttac tgtctcctct    360
```

<210> SEQ ID NO 34
<211> LENGTH: 333
<212> TYPE: DNA
<213> ORGANISM: Artificial Sequence
<220> FEATURE:
<223> OTHER INFORMATION: CL7 Light-Chain Variable Region

<400> SEQUENCE: 34

```
gaaattgtct tgactcaatc tccagctaca ttgtccttaa gtcctggtga aagagccaca     60
ttgtcatgca gagcttccaa aggtgtatct acctcaggtt actcttactt gcattggtat    120
caacaaaagc caggtcaagc acctagattt ttgatctact tggccagtta cttggaatct    180
ggtgttccag ctagattttc cggtagtggt tctggtactg acttcacatt gaccatatct    240
tcattagaac tgaagatttt cgcagtctat tattgccaac attcctatag ttttccactc    300
acattcggtg gtggtacaaa ggtagaaata aaa                                 333
```

<210> SEQ ID NO 35
<211> LENGTH: 360
<212> TYPE: DNA
<213> ORGANISM: Artificial Sequence
<220> FEATURE:
<223> OTHER INFORMATION: CL6 Heavy-Chain Variable Region

<400> SEQUENCE: 35

```
caagttcaat tagtccaaag tggtgtcgaa gtaaagaagc caggtgcctc agtcaaagtc     60
agttgtaaag cctcaggtta tacatttaca aactactaca tgtactgggt tacacaagcc    120
ccaggtcaag gtttggaatg gatgggtggt atcaatcctt caaacggtgg caccaacttc    180
aacgaaaagt tcaagaacag agtaactttg actacagatt cttcaaccac tacagcatac    240
atggaattga atctttaca attcgatgac acagctgttt actactgtgc agcccgtgat    300
tacagatttg acatgggttt cgagttctgg ggtcaaggta ccactgttac tgtctcctct    360
```

<210> SEQ ID NO 36
<211> LENGTH: 333
<212> TYPE: DNA
<213> ORGANISM: Artificial Sequence
<220> FEATURE:
<223> OTHER INFORMATION: CL6 Light-Chain Variable Region

<400> SEQUENCE: 36

```
gaaattgtct tgactcaatc tccagctaca ttgtccttaa gtcctggtga aagagccaca     60
ttgtcatgca gagcttccaa aggtgtatct acctcaggtt actcttactt gcattggtat    120
caacaaaagc caggtcaagc acctagattt ttgatctact tggccagtta cttggaatct    180
ggtgttccag ctagatgttc cggtagtggt tctggtactg acttcacatt gaccatatct    240
tcattagaac tgaagatgtt cgcagtctat tattgccaac attcctatga ccttccactt    300
acattcggtg gtggtacaaa ggtagagata aaa                                 333
```

<210> SEQ ID NO 37
<211> LENGTH: 120
<212> TYPE: PRT
<213> ORGANISM: Artificial Sequence

```
<220> FEATURE:
<223> OTHER INFORMATION: CL2 Heavy-Chain Variable Region

<400> SEQUENCE: 37

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Ala Tyr
65                  70                  75                  80

Met Glu Leu Lys Ser Leu Gln Phe Asp Asp Thr Ala Val Tyr Tyr Cys
                85                  90                  95

Ala Ala Arg Asp Tyr Lys Phe Asp Met Gly Phe Glu Tyr Trp Gly Gln
            100                 105                 110

Gly Thr Thr Val Thr Val Ser Ser
        115                 120

<210> SEQ ID NO 38
<211> LENGTH: 111
<212> TYPE: PRT
<213> ORGANISM: Artificial Sequence
<220> FEATURE:
<223> OTHER INFORMATION: CL2 Light-Chain Variable Region

<400> SEQUENCE: 38

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Tyr
                85                  90                  95

Gly Leu Pro Leu Thr Phe Gly Gly Gly Thr Lys Val Glu Ile Lys
            100                 105                 110

<210> SEQ ID NO 39
<211> LENGTH: 120
<212> TYPE: PRT
<213> ORGANISM: Artificial Sequence
<220> FEATURE:
<223> OTHER INFORMATION: CL7 Heavy-Chain Variable Region

<400> SEQUENCE: 39

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45
```

Gly Gly Ile Asn Pro Ser Asn Gly Gly Thr Asn Phe Asn Glu Lys Phe
            50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Ala Arg Asp Tyr Arg Phe Asp Met Gly Phe Glu Phe Trp Gly Gln
                100                 105                 110

Gly Thr Thr Val Thr Val Ser Ser
            115                 120

<210> SEQ ID NO 40
<211> LENGTH: 111
<212> TYPE: PRT
<213> ORGANISM: Artificial Sequence
<220> FEATURE:
<223> OTHER INFORMATION: CL7 Light-Chain Variable Region

<400> SEQUENCE: 40

Glu Ile Val Leu Thr Gln Ser Pro Ala Thr Leu Ser Leu Ser Pro Gly
  1               5                  10                  15

Glu Arg Ala Thr Leu Ser Cys Arg Ala Ser Lys Gly Val Ser Thr Ser
                 20                  25                  30

Gly Tyr Ser Tyr Leu His Trp Tyr Gln Gln Lys Pro Gly Gln Ala Pro
             35                  40                  45

Arg Leu Leu Ile Tyr Leu Ala Ser Tyr Leu Glu Ser Gly Val Pro Ala
 50                  55                  60

Arg Phe Ser Gly Ser Gly Ser Gly Thr Asp Phe Thr Leu Thr Ile Ser
 65                  70                  75                  80

Ser Leu Glu Pro Glu Asp Phe Ala Val Tyr Tyr Cys Gln His Ser Tyr
                 85                  90                  95

Ser Phe Pro Leu Thr Phe Gly Gly Gly Thr Lys Val Glu Ile Lys
                100                 105                 110

<210> SEQ ID NO 41
<211> LENGTH: 120
<212> TYPE: PRT
<213> ORGANISM: Artificial Sequence
<220> FEATURE:
<223> OTHER INFORMATION: CL6 Heavy-Chain Variable Region

<400> SEQUENCE: 41

Gln Val Gln Leu Val Gln Ser Gly Val Glu Val Lys Lys Pro Gly Ala
  1               5                  10                  15

Ser Val Lys Val Ser Cys Lys Ala Ser Gly Tyr Thr Phe Thr Asn Tyr
                 20                  25                  30

Tyr Met Tyr Trp Val Arg Gln Ala Pro Gly Gln Gly Leu Glu Trp Met
             35                  40                  45

Gly Gly Ile Asn Pro Ser Asn Gly Gly Thr Asn Phe Asn Glu Lys Phe
 50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Ala Arg Asp Tyr Arg Phe Asp Met Gly Phe Glu Phe Trp Gly Gln
                100                 105                 110

Gly Thr Thr Val Thr Val Ser Ser
            115                 120

<210> SEQ ID NO 42
<211> LENGTH: 111
<212> TYPE: PRT
<213> ORGANISM: Artificial Sequence
<220> FEATURE:
<223> OTHER INFORMATION: CL6 Light-Chain Variable Region

<400> SEQUENCE: 42

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Tyr
                85                  90                  95

Asp Leu Pro Leu Thr Phe Gly Gly Gly Thr Lys Val Glu Ile Lys
            100                 105                 110

<210> SEQ ID NO 43
<211> LENGTH: 14
<212> TYPE: PRT
<213> ORGANISM: Artificial Sequence
<220> FEATURE:
<223> OTHER INFORMATION: CL2 Light-Chain CDR1

<400> SEQUENCE: 43

Ala Ser Lys Gly Val Ser Thr Ser Gly Tyr Ser Tyr Leu His
1               5                   10

<210> SEQ ID NO 44
<211> LENGTH: 6
<212> TYPE: PRT
<213> ORGANISM: Artificial Sequence
<220> FEATURE:
<223> OTHER INFORMATION: CL2 Light-Chain CDR2

<400> SEQUENCE: 44

Leu Ala Ser Tyr Leu Glu
1               5

<210> SEQ ID NO 45
<211> LENGTH: 11
<212> TYPE: PRT
<213> ORGANISM: Artificial Sequence
<220> FEATURE:
<223> OTHER INFORMATION: CL2 Light-Chain CDR3

<400> SEQUENCE: 45

Tyr Cys Gln His Ser Tyr Gly Leu Pro Leu Thr
1               5                   10

<210> SEQ ID NO 46
<211> LENGTH: 6
<212> TYPE: PRT
<213> ORGANISM: Artificial Sequence
<220> FEATURE:
<223> OTHER INFORMATION: CL2 Heavy-Chain CDR1

```
<400> SEQUENCE: 46

Asn Tyr Tyr Met Tyr Trp
1               5

<210> SEQ ID NO 47
<211> LENGTH: 15
<212> TYPE: PRT
<213> ORGANISM: Artificial Sequence
<220> FEATURE:
<223> OTHER INFORMATION: CL2 Heavy-Chain CDR2

<400> SEQUENCE: 47

Gly Ile Asn Pro Ser Asn Gly Gly Thr Asn Phe Asn Glu Lys Phe
1               5                   10                  15

<210> SEQ ID NO 48
<211> LENGTH: 12
<212> TYPE: PRT
<213> ORGANISM: Artificial Sequence
<220> FEATURE:
<223> OTHER INFORMATION: CL2 Heavy-Chain CDR3

<400> SEQUENCE: 48

Ala Arg Asp Tyr Lys Phe Asp Met Gly Phe Glu Tyr
1               5                   10

<210> SEQ ID NO 49
<211> LENGTH: 14
<212> TYPE: PRT
<213> ORGANISM: Artificial Sequence
<220> FEATURE:
<223> OTHER INFORMATION: CL7 Light-Chain CDR1

<400> SEQUENCE: 49

Ala Ser Lys Gly Val Ser Thr Ser Gly Tyr Ser Tyr Leu His
1               5                   10

<210> SEQ ID NO 50
<211> LENGTH: 6
<212> TYPE: PRT
<213> ORGANISM: Artificial Sequence
<220> FEATURE:
<223> OTHER INFORMATION: CL7 Light-Chain CDR2

<400> SEQUENCE: 50

Leu Ala Ser Tyr Leu Glu
1               5

<210> SEQ ID NO 51
<211> LENGTH: 11
<212> TYPE: PRT
<213> ORGANISM: Artificial Sequence
<220> FEATURE:
<223> OTHER INFORMATION: CL7 Light-Chain CDR3

<400> SEQUENCE: 51

Tyr Cys Gln His Ser Tyr Ser Phe Pro Leu Thr
1               5                   10

<210> SEQ ID NO 52
<211> LENGTH: 6
<212> TYPE: PRT
<213> ORGANISM: Artificial Sequence
<220> FEATURE:
<223> OTHER INFORMATION: CL7 Heavy-Chain CDR1

<400> SEQUENCE: 52
```

```
Asn Tyr Tyr Met Tyr Trp
1               5

<210> SEQ ID NO 53
<211> LENGTH: 15
<212> TYPE: PRT
<213> ORGANISM: Artificial Sequence
<220> FEATURE:
<223> OTHER INFORMATION: CL7 Heavy-Chain CDR2

<400> SEQUENCE: 53

Gly Ile Asn Pro Ser Asn Gly Gly Thr Asn Phe Asn Glu Lys Phe
1               5                   10                  15

<210> SEQ ID NO 54
<211> LENGTH: 12
<212> TYPE: PRT
<213> ORGANISM: Artificial Sequence
<220> FEATURE:
<223> OTHER INFORMATION: CL7 Heavy-Chain CDR3

<400> SEQUENCE: 54

Ala Arg Asp Tyr Arg Phe Asp Met Gly Phe Glu Phe
1               5                   10

<210> SEQ ID NO 55
<211> LENGTH: 14
<212> TYPE: PRT
<213> ORGANISM: Artificial Sequence
<220> FEATURE:
<223> OTHER INFORMATION: CL6 Light-Chain CDR1

<400> SEQUENCE: 55

Ala Ser Lys Gly Val Ser Thr Ser Gly Tyr Ser Tyr Leu His
1               5                   10

<210> SEQ ID NO 56
<211> LENGTH: 6
<212> TYPE: PRT
<213> ORGANISM: Artificial Sequence
<220> FEATURE:
<223> OTHER INFORMATION: CL6 Light-Chain CDR2

<400> SEQUENCE: 56

Leu Ala Ser Tyr Leu Glu
1               5

<210> SEQ ID NO 57
<211> LENGTH: 11
<212> TYPE: PRT
<213> ORGANISM: Artificial Sequence
<220> FEATURE:
<223> OTHER INFORMATION: CL6 Light-Chain CDR3

<400> SEQUENCE: 57

Tyr Cys Gln His Ser Tyr Asp Leu Pro Leu Thr
1               5                   10

<210> SEQ ID NO 58
<211> LENGTH: 6
<212> TYPE: PRT
<213> ORGANISM: Artificial Sequence
<220> FEATURE:
<223> OTHER INFORMATION: CL6 Heavy-Chain CDR1

<400> SEQUENCE: 58
```

Asn Tyr Tyr Met Tyr Trp
1               5

<210> SEQ ID NO 59
<211> LENGTH: 15
<212> TYPE: PRT
<213> ORGANISM: Artificial Sequence
<220> FEATURE:
<223> OTHER INFORMATION: CL6 Heavy-Chain CDR2

<400> SEQUENCE: 59

Gly Ile Asn Pro Ser Asn Gly Gly Thr Asn Phe Asn Glu Lys Phe
1               5                   10                  15

<210> SEQ ID NO 60
<211> LENGTH: 12
<212> TYPE: PRT
<213> ORGANISM: Artificial Sequence
<220> FEATURE:
<223> OTHER INFORMATION: CL6 Heavy-Chain CDR3

<400> SEQUENCE: 60

Ala Arg Asp Tyr Arg Phe Asp Met Gly Phe Glu Phe
1               5                   10

<210> SEQ ID NO 61
<211> LENGTH: 360
<212> TYPE: DNA
<213> ORGANISM: Artificial Sequence
<220> FEATURE:
<223> OTHER INFORMATION: CL20 Heavy-Chain Variable Region

<400> SEQUENCE: 61
caggtgcagc tggtgcagtc aggggtggag gtcaaaaagc ccggtgcctc agtcaaagtg      60
tcttgtaaag cctctggata tacatttact aactactata tgtactgggt gaggcaggca     120
ccaggacagg gtctggagtg gatgggcgga atcaacccct ctaatggggg taccaacttc     180
aacgaaaagt ttaaaaaccg ggtgacactg accacagatt ccagcactac cacagcctat     240
atggagctga gtccctgca gttcgacgat acagcagtgt actattgcgc aggcgggac      300 tacagattcg atatgggctt tgactattgg ggccaggaa ctaccgtcac cgtgtctagt     360

<210> SEQ ID NO 62
<211> LENGTH: 333
<212> TYPE: DNA
<213> ORGANISM: Artificial Sequence
<220> FEATURE:
<223> OTHER INFORMATION: CL20 Light-Chain Variable Region

<400> SEQUENCE: 62
gaaattgtgc tgacccagag ccccgccact ctgtctctga gtccaggaga gagggccacc      60
ctgtcatgcc gagcttccaa gggcgtgtcc acctccggct acagttatct gcactggtac     120
cagcagaaac ccggacaggc acctagactg ctgatctacc tggccagcta tctggaatct     180
ggcgtgccag ctaggttcag cggctctgga agtgggaccg actttaccct gacaatttcc     240
agcctggagc ccgaagattt cgcagtctac tattgccagc attctcgtga cctgcccctg     300
acattcggcg gtggaacaaa agtggaaatc aag                                  333

<210> SEQ ID NO 63
<211> LENGTH: 120
<212> TYPE: PRT
<213> ORGANISM: Artificial Sequence
<220> FEATURE:

<223> OTHER INFORMATION: CL20 Heavy-Chain Variable Region

<400> SEQUENCE: 63

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
            20                  25                  30

Tyr Met Tyr Trp Val Arg Gln Ala Pro Gly Gln Gly Leu Glu Trp Met
        35                  40                  45

Gly Gly Ile Asn Pro Ser Asn Gly Gly Thr Asn Phe Asn Glu Lys Phe
    50                  55                  60

Lys Asn Arg Val Thr Leu Thr Thr Asp Ser Ser Thr Thr Thr Ala Tyr
65                  70                  75                  80

Met Glu Leu Lys Ser Leu Gln Phe Asp Asp Thr Ala Val Tyr Tyr Cys
                85                  90                  95

Ala Arg Arg Asp Tyr Arg Phe Asp Met Gly Phe Asp Tyr Trp Gly Gln
            100                 105                 110

Gly Thr Thr Val Thr Val Ser Ser
        115                 120

<210> SEQ ID NO 64
<211> LENGTH: 111
<212> TYPE: PRT
<213> ORGANISM: Artificial Sequence
<220> FEATURE:
<223> OTHER INFORMATION: CL20 Light-Chain Variable Region

<400> SEQUENCE: 64

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ser Arg
                85                  90                  95

Asp Leu Pro Leu Thr Phe Gly Gly Gly Thr Lys Val Glu Ile Lys
            100                 105                 110

<210> SEQ ID NO 65
<211> LENGTH: 15
<212> TYPE: PRT
<213> ORGANISM: Artificial Sequence
<220> FEATURE:
<223> OTHER INFORMATION: CL20 Light-Chain CDR1

<400> SEQUENCE: 65

Arg Ala Ser Lys Gly Val Ser Thr Ser Gly Tyr Ser Tyr Leu His
1               5                   10                  15

<210> SEQ ID NO 66
<211> LENGTH: 7
<212> TYPE: PRT
<213> ORGANISM: Artificial Sequence
<220> FEATURE:
<223> OTHER INFORMATION: CL20 Light-Chain CDR2

<400> SEQUENCE: 66

Leu Ala Ser Tyr Leu Glu Ser
1               5

<210> SEQ ID NO 67
<211> LENGTH: 9
<212> TYPE: PRT
<213> ORGANISM: Artificial Sequence
<220> FEATURE:
<223> OTHER INFORMATION: CL20 Light-Chain CDR3

<400> SEQUENCE: 67

Gln His Ser Arg Asp Leu Pro Leu Thr
1               5

<210> SEQ ID NO 68
<211> LENGTH: 5
<212> TYPE: PRT
<213> ORGANISM: Artificial Sequence
<220> FEATURE:
<223> OTHER INFORMATION: CL20 Heavy-Chain CDR1

<400> SEQUENCE: 68

Asn Tyr Tyr Met Tyr
1               5

<210> SEQ ID NO 69
<211> LENGTH: 17
<212> TYPE: PRT
<213> ORGANISM: Artificial Sequence
<220> FEATURE:
<223> OTHER INFORMATION: CL20 Heavy-Chain CDR2

<400> SEQUENCE: 69

Gly Ile Asn Pro Ser Asn Gly Gly Thr Asn Phe Asn Glu Lys Phe Lys
1               5                   10                  15

Asn

<210> SEQ ID NO 70
<211> LENGTH: 11
<212> TYPE: PRT
<213> ORGANISM: Artificial Sequence
<220> FEATURE:
<223> OTHER INFORMATION: CL20 Heavy-Chain CDR3

<400> SEQUENCE: 70

Arg Asp Tyr Arg Phe Asp Met Gly Phe Asp Tyr
1               5                   10

<210> SEQ ID NO 71
<211> LENGTH: 447
<212> TYPE: PRT
<213> ORGANISM: Artificial Sequence
<220> FEATURE:
<223> OTHER INFORMATION: CL1 Heavy Chain Full Length

<400> SEQUENCE: 71

Gln Val Gln Leu Val Gln Ser Gly Val Glu Val Lys Lys Pro Gly Ala
1               5                   10                  15

Ser Val Lys Val Ser Cys Lys Ala Ser Gly Tyr Thr Phe Thr Asn Tyr
                20                  25                  30

Tyr Met Tyr Trp Val Arg Gln Ala Pro Gly Gln Gly Leu Glu Trp Met
            35                  40                  45

Gly Gly Ile Asn Pro Ser Asn Gly Gly Thr Asn Phe Asn Glu Lys Phe
            50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Ala Arg Asp Tyr Arg Leu Asp Met Gly Phe Glu Phe Trp Gly Gln
            100                 105                 110

Gly Thr Thr Val Thr Val Ser Ala Ser Thr Lys Gly Pro Ser Val
            115                 120                 125

Phe Pro Leu Ala Pro Cys Ser Arg Ser Thr Ser Glu Ser Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
195                 200                 205

Pro Ser Asn Thr Lys Val Asp Lys Arg Val Glu Ser Lys Tyr Gly Pro
210                 215                 220

Pro Cys Pro Pro Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser Gln Glu Asp Pro Glu
            260                 265                 270

Val Gln Phe Asn Trp Tyr Val Asp Gly Val Glu Val His Asn Ala Lys
                275                 280                 285

Thr Lys Pro Arg Glu Glu Gln Phe Asn Ser Thr Tyr Arg Val Val Ser
            290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Gln Glu Glu Met Thr Lys Asn Gln Val Ser Leu Thr Cys Leu
            355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
                405                 410                 415

Trp Gln Glu Gly Asn Val Phe Ser Cys Ser Val Met His Glu Ala Leu
            420                 425                 430

His Asn His Tyr Thr Gln Lys Ser Leu Ser Leu Ser Leu Gly Lys
            435                 440                 445

<210> SEQ ID NO 72
<211> LENGTH: 218
<212> TYPE: PRT

<213> ORGANISM: Artificial Sequence
<220> FEATURE:
<223> OTHER INFORMATION: CL1 Light Chain Full Length

<400> SEQUENCE: 72

```
Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45

Arg Leu Leu Ile Tyr Leu Ala Ser Tyr Leu Glu Ser Gly Val Pro Ala
    50                  55                  60

Arg Phe Ser Gly Ser Gly Ser Gly Thr Asp Phe Thr Leu Thr Ile Ser
65                  70                  75                  80

Ser Leu Glu Pro Glu Asp Phe Ala Val Tyr Tyr Cys Gln His Ala Tyr
                85                  90                  95

Asp Leu Pro Leu Thr Phe Gly Gly Gly Thr Lys Val Glu Ile Lys Arg
            100                 105                 110

Thr Val Ala Ala Pro Ser Val Phe Ile Phe Pro Pro Ser Asp Glu Gln
        115                 120                 125

Leu Lys Ser Gly Thr Ala Ser Val Val Cys Leu Leu Asn Asn Phe Tyr
    130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
        195                 200                 205

Val Thr Lys Ser Phe Asn Arg Gly Glu Cys
    210                 215
```

<210> SEQ ID NO 73
<211> LENGTH: 1341
<212> TYPE: DNA
<213> ORGANISM: Artificial Sequence
<220> FEATURE:
<223> OTHER INFORMATION: CL1 Heavy Chain Full Length

<400> SEQUENCE: 73

| | |
|---|---|
| caggtgcagc tggtgcagtc cggcgtggag gtgaagaagc ctggcgccag cgtgaaggtg | 60 |
| tcctgtaagg ccagcggcta caccttcacc aattactata tgtattgggt gcggcaggcc | 120 |
| cccggccagg gactggagtg gatgggaggc atcaatccca gcaacggcgg caccaacttc | 180 |
| aatgagaagt ttaagaaccg ggtgaccctg accaccgata gcagcaccac caccgcttac | 240 |
| atggagctga gagcctgca gtttgacgat accgctgtgt actattgcgc tgcccgggat | 300 |
| tacaggctgg acatgggctt cgagttctgg ggccagggca ccaccgtgac cgtgtccagc | 360 |
| gctagcacca agggcccttc cgtgttcccc ctggcccct gtagccggtc cacctctgag | 420 |
| agcaccgctg ctctgggctg tctggtgaag gattactttc ccgaaccggt gaccgtgtca | 480 |
| tggaactccg gggctctgac atccggtgtc cacacttttc ctgcagtgct gcagtcatcc | 540 |
| ggcctgtaca gcctgagctc tgtggtcaca gtcccaagtt catccctggg aaccaagaca | 600 |
| tatacttgca acgtggatca taaacccagc aatactaagg tcgacaaacg agtggagtct | 660 |

-continued

```
aagtacggac caccttgccc accatgtcca gcacctgagt tcctgggagg accaagcgtg    720
ttcctgtttc ctccaaagcc taaagatacc ctgatgatca gtcggactcc cgaggtcacc    780
tgcgtggtcg tggacgtgtc ccaggaggac cctgaagtcc agttcaactg gtacgtggac    840
ggcgtcgaag tgcacaatgc taagacaaaa cctcgagagg aacagtttaa ctccacatac    900
cgtgtcgtga gcgtcctgac tgtgctgcat caggattggc tgaacggcaa ggagtataag    960
tgcaaagtga gcaataaggg actgccaagc tctatcgaga aaactatttc taaggctaaa   1020
ggacagccta gggaaccaca ggtgtacacc ctgcccccta gtcaggagga aatgactaag   1080
aaccaggtct cactgacctg tctggtgaaa gggttctatc cttcagatat tgcagtggag   1140
tgggaatcca atggtcagcc agagaacaat tacaagacaa ctccaccgt gctggacagc   1200 gatgggtctt tctttctgta ttctagactg accgtggaca aaagtcgctg gcaggagggt   1260
aatgtctttt cttgtagtgt gatgcacgaa gccctgcaca accactacac tcagaaaagc   1320
ctgtcactgt ccctgggtaa a                                              1341
```

<210> SEQ ID NO 74
<211> LENGTH: 654
<212> TYPE: DNA
<213> ORGANISM: Artificial Sequence
<220> FEATURE:
<223> OTHER INFORMATION: CL1 Light Chain Full Length

<400> SEQUENCE: 74

```
gagatcgtgc tgacccagtc ccccgctacc ctgagcctgt cccccggaga gcgggctacc     60
ctgtcttgtc gggcctccaa gggcgtgagc accagcggat actcctatct gcactggtac    120
cagcagaagc ccggccaggc tcccaggctg ctgatctacc tggcttccta cctggagagc    180
ggcgtgcccg ctaggtttag cggcagcggc agcggaaccg atttcaccct gaccatcagc    240
tccctggagc ccgaggattt tgccgtgtac tactgccagc acgcttacga cctgcccctg    300
acctttggcg gcggcaccaa ggtggagatc aagcgtacgg tggctgcacc atctgtcttc    360
atcttcccgc catctgatga gcagttgaaa tctggaactg cctctgttgt gtgcctgctg    420
aataacttct atcccagaga ggccaaagta cagtggaagg tggataacgc cctccaatcg    480
ggtaactccc aggagagtgt cacagagcag gacagcaagg acagcaccta cagcctcagc    540
agcaccctga cgctgagcaa agcagactac gagaaacaca aagtctacgc ctgcgaagtc    600
acccatcagg gcctgagctc gcccgtcaca aagagcttca caggggaga gtgt            654
```